(12) United States Patent
Tanemura et al.

(10) Patent No.: US 12,032,062 B2
(45) Date of Patent: Jul. 9, 2024

(54) OBSTACLE DETECTION APPARATUS

(71) Applicant: DENSO CORPORATION, Kariya (JP)

(72) Inventors: Tomoki Tanemura, Kariya (JP); Nobuaki Matsudaira, Kariya (JP); Ippei Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 17/723,681

(22) Filed: Apr. 19, 2022

(65) Prior Publication Data
US 2022/0260713 A1  Aug. 18, 2022

Related U.S. Application Data

(63) Continuation of application No. PCT/JP2020/044862, filed on Dec. 2, 2020.

(30) Foreign Application Priority Data

Dec. 4, 2019  (JP) .................................. 2019-219746

(51) Int. Cl.
   *G01S 15/931*  (2020.01)
   *B60W 30/06*   (2006.01)
   (Continued)

(52) U.S. Cl.
   CPC ............ *G01S 15/931* (2013.01); *G01S 15/46* (2013.01); *G05D 1/0255* (2013.01); *B60W 30/06* (2013.01);
   (Continued)

(58) Field of Classification Search
   CPC .. G01S 15/931; G01S 15/46; G01S 2015/465; G01S 7/539; G01D 1/0255; B60W 2420/54; B60W 30/06
   See application file for complete search history.

(56) References Cited

U.S. PATENT DOCUMENTS

| 9,638,800 B1* | 5/2017 | Skowronek | ............ G01S 15/42 |
| 2008/0040004 A1* | 2/2008 | Breed | ..................... G01S 7/023 |
| | | | 701/45 |

(Continued)

FOREIGN PATENT DOCUMENTS

| JP | H06-242238 A | 9/1994 |
| JP | H07-092263 A | 4/1995 |

(Continued)

OTHER PUBLICATIONS

JP-2014074665-A (Machine Translation) (Year: 2014).*
JP-2006343309-A (Machine Translation) (Year: 2006).*
JP-2011112416-A (Machine Translation) (Year: 2011).*

*Primary Examiner* — Yuqing Xiao
*Assistant Examiner* — Christopher Richard Walker
(74) *Attorney, Agent, or Firm* — Posz Law Group, PLC

(57) ABSTRACT

An obstacle detection apparatus that detects an obstacle existing around a vehicle is provided to include an ultrasonic sensor and a controller. The ultrasonic sensor is provided in the vehicle at a position having a predetermined height from a road surface. The ultrasonic sensor includes a plurality of ultrasonic elements configured to transmit an exploration wave toward outside of the vehicle, and receive a reflected wave reflected by an obstacle as a reception wave. The controller is configured to derive (i) an obstacle distance and (ii) an obstacle height based on an intensity of the reception wave received by each of the plurality of ultrasonic elements and a phase difference in the reception wave received by each of the plurality of ultrasonic elements.

12 Claims, 25 Drawing Sheets

(51) Int. Cl.
 *G01S 15/46* (2006.01)
 *G05D 1/00* (2024.01)
(52) U.S. Cl.
 CPC .... *B60W 2420/54* (2013.01); *G01S 2015/465* (2013.01)

(56) References Cited

U.S. PATENT DOCUMENTS

| | | | | |
|---|---|---|---|---|
| 2008/0296529 | A1* | 12/2008 | Akiyama | H10N 30/853 252/62.9 PZ |
| 2010/0024557 | A1* | 2/2010 | Matsuura | G01S 15/931 73/627 |
| 2010/0220550 | A1* | 9/2010 | Akiyama | G01S 7/5273 367/93 |
| 2012/0224456 | A1* | 9/2012 | Visser | G01S 7/521 367/118 |
| 2013/0100774 | A1* | 4/2013 | Brown | G01S 15/931 367/99 |
| 2015/0307091 | A1 | 10/2015 | Gokan et al. | |
| 2017/0326590 | A1 | 11/2017 | Daneman | |
| 2018/0153512 | A1 | 6/2018 | Akkaraju et al. | |

FOREIGN PATENT DOCUMENTS

| | | | | |
|---|---|---|---|---|
| JP | 2006-343309 | A | | 12/2006 |
| JP | 2006343309 | A * | | 12/2006 |
| JP | 2011112416 | A * | | 6/2011 |
| JP | 2014-074665 | A | | 4/2014 |
| JP | 2014074665 | A * | 4/2014 | ............ G01B 11/06 |
| JP | 6340713 | B2 | | 6/2018 |
| WO | 2019/053812 | A1 | | 3/2019 |

\* cited by examiner

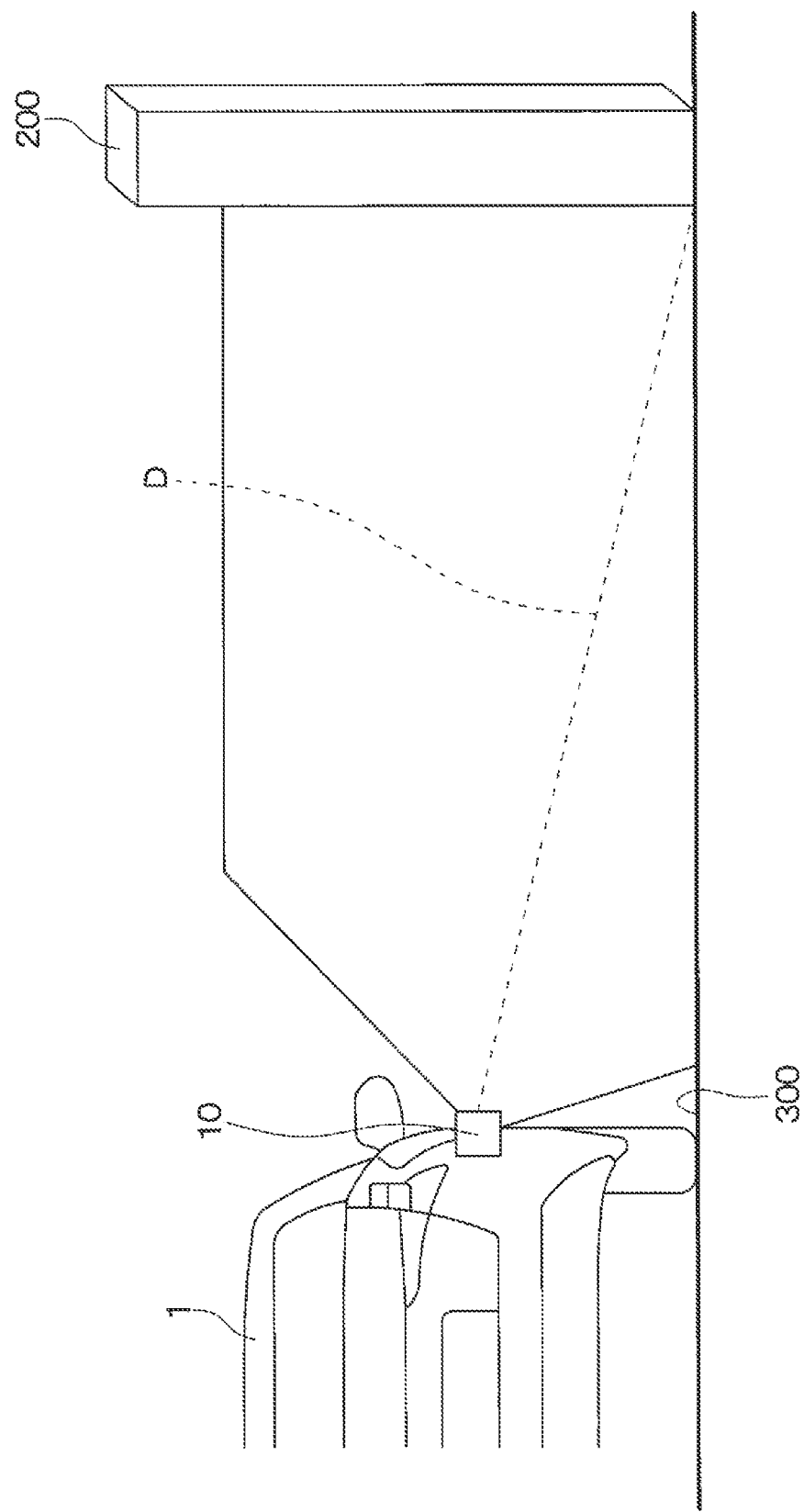

OBSTACLE DETECTION APPARATUS

CROSS REFERENCE TO RELATED APPLICATIONS

The present application is a continuation application of International Patent Application No. PCT/JP2020/044862 filed on Dec. 2, 2020, which designated the U.S. and claims the benefit of priority from Japanese Patent Application No. 2019-219746 filed on Dec. 4, 2019. The entire disclosures of all of the above applications are incorporated herein by reference.

TECHNICAL FIELD

The present disclosure relates to an obstacle detection apparatus using an ultrasonic sensor.

BACKGROUND

There has been proposed an obstacle detection apparatus using an ultrasonic sensor. Specifically, in this obstacle detection apparatus, an ultrasonic sensor is provided at a position with a predetermined height of the vehicle. Then, when the ultrasonic sensor transmits an exploration wave and then receives a reception wave, the obstacle detection apparatus determines the height of the obstacle based on the number of maximum peaks included in the reception wave. Specifically, when there are multiple maximum peaks contained in the reception wave, the obstacle detection apparatus determines that there is a high height obstacle having a height higher than the position where the ultrasonic sensor is provided. In contrast, when there is one maximum peak contained in the reception wave, the obstacle detection apparatus determines that there is a low height obstacle having a height lower than that of the position where the ultrasonic sensor is provided. For instance, the high height obstacle is a wall; the low height obstacle is a curb or a tire stopper block.

In addition, when an obstacle detection apparatus receives a reception wave after the ultrasonic sensor transmits the exploration wave, the obstacle detection apparatus derives the obstacle distance to the obstacle based on the period of time from the transmission of the exploration wave to the reception of the reception wave.

SUMMARY

According to an example of the present disclosure, an obstacle detection apparatus that detects an obstacle existing around a vehicle is provided to include an ultrasonic sensor and a controller. The ultrasonic sensor is provided in the vehicle at a position having a predetermined height from a road surface. The ultrasonic sensor includes a plurality of ultrasonic elements configured to transmit an exploration wave toward outside of the vehicle, and receive a reflected wave reflected by an obstacle as a reception wave. The controller is configured to derive (i) an obstacle distance and (ii) an obstacle height based on an intensity of the reception wave received by each of the plurality of ultrasonic elements and a phase difference in the reception wave received by each of the plurality of ultrasonic elements.

BRIEF DESCRIPTION OF THE DRAWINGS

The objects, features, and advantages of the present disclosure will become more apparent from the following detailed description made with reference to the accompanying drawings. In the drawings:

FIG. 21 is a schematic diagram showing a state in which an exploration wave is transmitted from an ultrasonic sensor according to the sixth embodiment;

DETAILED DESCRIPTION

Hereinafter, embodiments of the present disclosure will be described with reference to the drawings. In the following embodiments, the same or equivalent parts are denoted by the same reference signs.

First Embodiment

A first embodiment will be described with reference to the drawings. An obstacle detection apparatus of the present embodiment is mounted on a vehicle and used to detect an obstacle existing around a vehicle. Hereinafter, an example in which the obstacle detection apparatus of the present embodiment is used as a parking assistance apparatus will be described.

Figure 1:
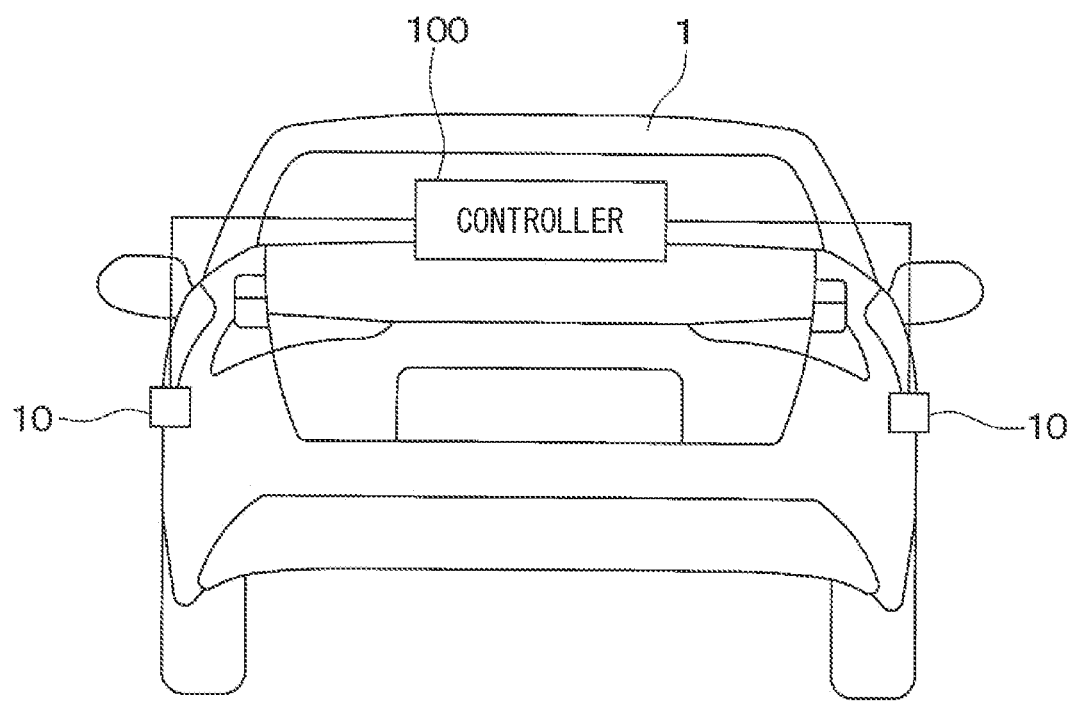
FIG. 1 is a schematic diagram which shows a structure of an obstacle detection apparatus.

In the present embodiment, as shown in FIG. 1, an obstacle detection apparatus includes an ultrasonic sensor 10 provided in a vehicle 1 and a controller unit 100 connected to the ultrasonic sensor 10. In the present embodiment, the vehicle 1 is, for example, a so-called four-wheeled vehicle, and is configured to include a substantially rectangular vehicle body in a plan view and tires provided on the vehicle body. Further, in FIG. 1, the ultrasonic sensor 10 is provided on each of the right side and the left side of the vehicle, but is also provided on each of the front side and the rear side of the vehicle.

The ultrasonic sensor 10 is configured to transmit an exploration wave, which is an ultrasonic wave, along a directivity axis. The exploration wave is transmitted from the ultrasonic sensor 10 with a predetermined spread (that is, a directivity angle). The directivity axis is a virtual straight line extending along the exploration wave transmitted from the ultrasonic sensor 10 and serves as a reference for the directivity angle. In other words, the directivity axis is the axis that passes through the center of the exploration wave. Further, the exploration wave is reflected by an obstacle existing in the surroundings. The ultrasonic sensor 10 is configured to receive a reception wave including the reflected wave and output a detection signal based on the reception result. In the following, receiving a reflected wave as a reception wave is also referred to simply as receiving a reflected wave.

Figure 2:
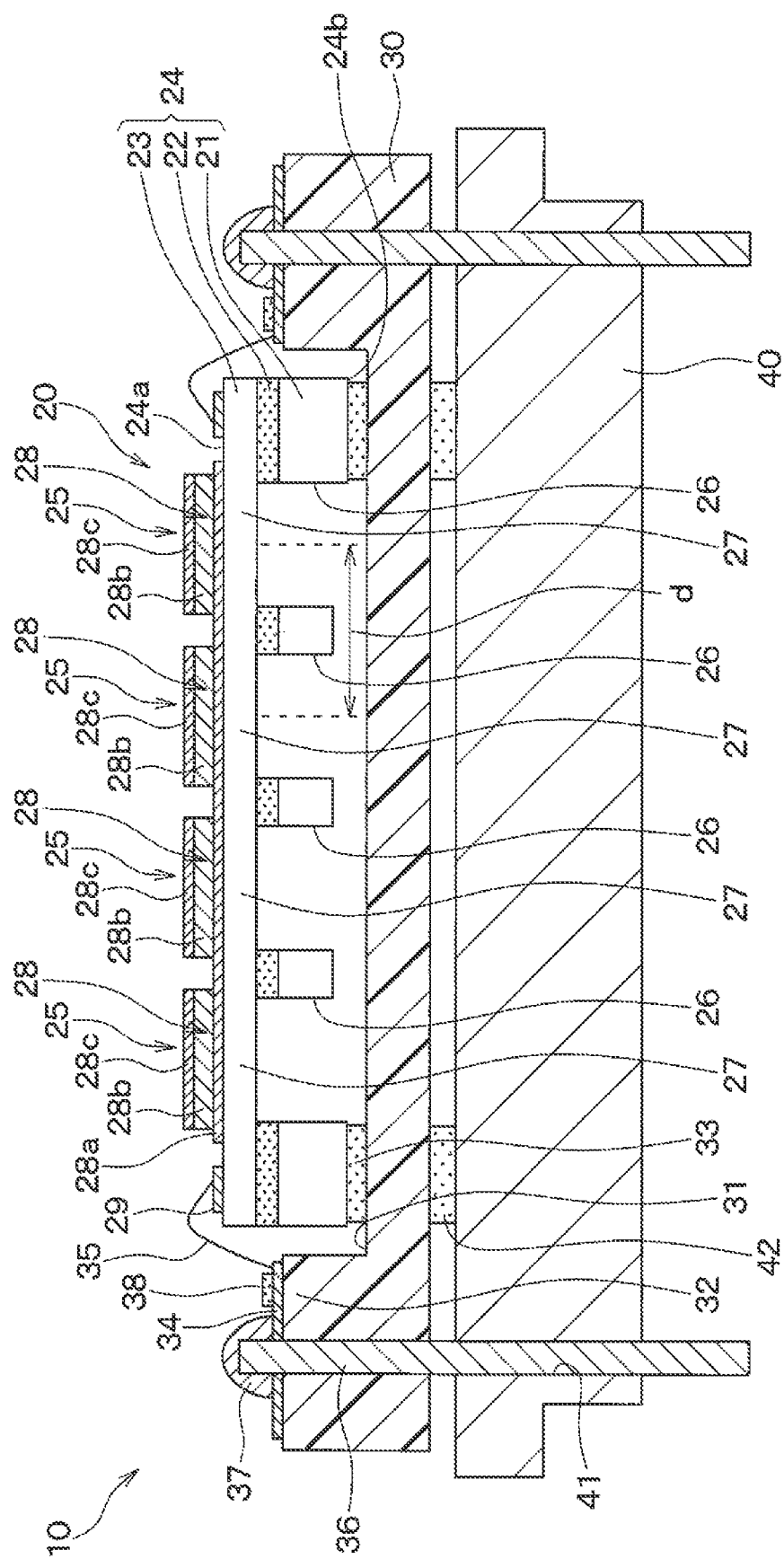
FIG. 2 is a cross-sectional view which shows a structure of an ultrasonic sensor.

Hereinafter, the configuration of the ultrasonic sensor 10 of the present embodiment will be specifically described. As shown in FIG. 2, the ultrasonic sensor 10 includes a transducer unit 20, a support member 30, and a housing 40.

In the present embodiment, the transducer unit 20 is a MEMS type configured by using a sensor substrate 24 to include a plurality of ultrasonic elements 25. The sensor substrate 24 is composed of an SOI substrate in which a support substrate 21, an embedded insulating film 22, and a semiconductor layer 23 are laminated in this order. Note that SOI is an abbreviation for Silicon On Insulator; MEMS is an abbreviation for Micro Electro Mechanical Systems. In the following, the sensor substrate 24, which includes the semiconductor layer 23, the embedded insulating film 22, and the support substrate 21, is defined as having a first surface 24a and a second surface 24b. In FIG. 2, the first surface 24a is an upper surface of the semiconductor layer 23 and is opposite a lower surface of the semiconductor layer 23; the lower surface on which the embedded insulating film 22 is provided. The second surface 24b is a lower surface of the support substrate 21 and is opposite an upper surface of the support substrate 21; the upper surface on which the embedded insulating film 22 is provided. That is, the sensor substrate 24 includes, in sequence from an upper side in FIG. 2, the first surface 24a, the semiconductor layer 23, the embedded insulating film 22, the support substrate 21, and the second surface 24b.

The sensor substrate 24 includes a plurality of concave portions 26 that are concaved from the second surface 24b, and a plurality of diaphragm portions 27 that face the concave portions 26. In the present embodiment, in the sensor substrate 24, the concave portions 26 are formed to permit the diaphragm portions 27 to be arranged two-dimensionally. Further, in the present embodiment, each concave portion 26 is formed so as to penetrate the embedded insulating film 22 and reach the semiconductor layer 23; thereby, the diaphragm portion 27 is formed by the semiconductor layer 23. Alternatively, the concave portion 26 may be formed so as to leave the embedded insulating film 22; thereby, the diaphragm portion 27 may be formed by the embedded insulating film 22 and the semiconductor layer 23.

A piezoelectric element 28 is formed on each diaphragm portion 27 by laminating, in sequence, a back surface electrode 28a, a piezoelectric film 28b, and a front surface electrode 28c. In this embodiment, a plurality of ultrasonic elements 25 are thereby formed on the sensor substrate 24 in this way. That is, the ultrasonic element 25 of this embodiment is configured as a PMUT. Here, PMUT is an abbreviation for Piezoelectric Micro-machined Ultrasonic Transducers.

In this embodiment, the back surface electrodes 28a of the respective piezoelectric elements 28 are integrated so that a common ground potential is applied. The piezoelectric film 28b is configured by a piezoelectric ceramic having no lead such as aluminum nitride (ScAlN) or aluminum nitride (AlN), or a piezoelectric ceramic containing lead such as lead zirconate titanate (PZT) but having high versatility. The piezoelectric film 28b is formed on the diaphragm portion 27 so as to have a planar shape equivalent to that of the diaphragm portion 27.

Figure 3:
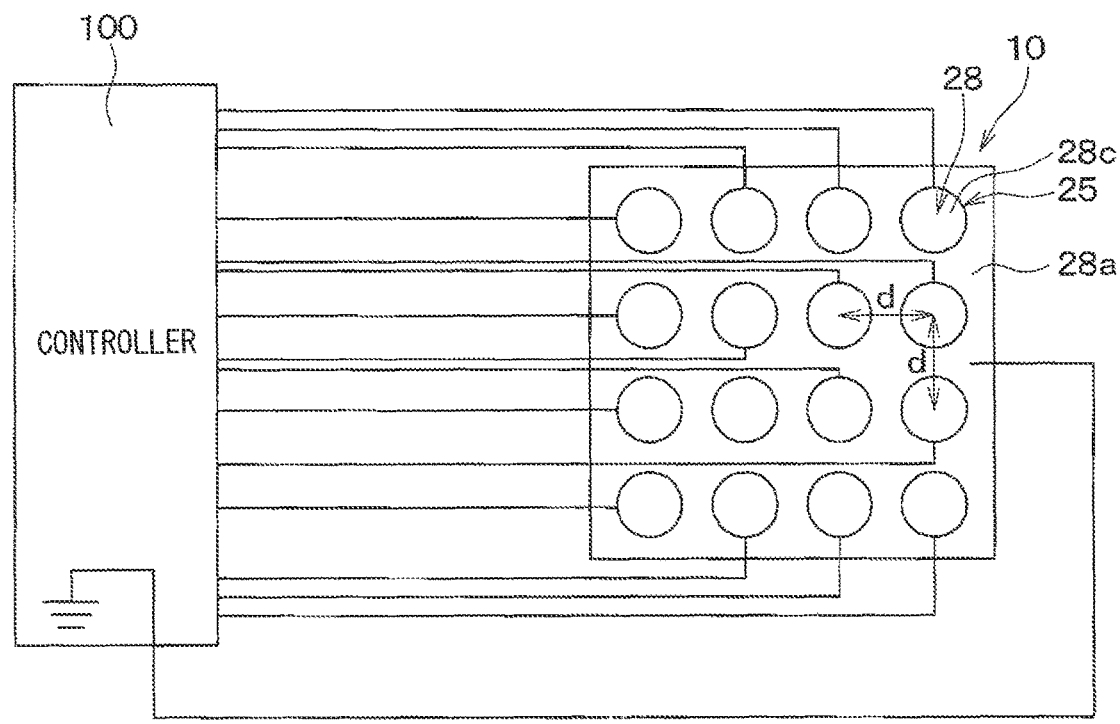
FIG. 3 is a schematic diagram which shows the connection between an ultrasonic sensor and a controller unit.

Since the diaphragm portion 27 is two-dimensionally formed in each ultrasonic element 25 as described above, each ultrasonic element 25 is in a two-dimensionally arranged state. Then, each ultrasonic element 25 is connected to the controller unit 100 via a bonding wire 35, a connection terminal 36, etc., which will be described later, as shown in FIG. 3. Note that FIG. 3 shows an example in which four ultrasonic elements 25 are formed in one direction in the plane direction of the sensor substrate 24, and four ultrasonic elements 25 are formed in a direction orthogonal to the one direction.

With reference to FIGS. 2 and 3, the distance between the centers of the adjacent ultrasonic elements 25 is defined as a distance d. In this case, it is preferable that the distance d is less than half the wavelength of the exploration wave so that the orientation is not binarized with respect to a certain phase difference. Note that the distance between the centers of the adjacent ultrasonic elements 25 is the distance between the centers of the adjacent diaphragm portions 27.

Further, as shown in FIG. 2, a pad portion 29 is formed on the first surface 24a of the sensor substrate 24 to be electrically connected to the back surface electrode 28a and the front surface electrode 28c.

In such an ultrasonic element 25, when a drive voltage which is an AC voltage is applied to the piezoelectric element 28, the diaphragm portion 27 ultrasonically vibrates and transmits an exploration wave. In this embodiment, as will be described later, the drive voltages having the same phase are applied to the respective piezoelectric elements 28 so that the directivity axis of the exploration wave accords with the normal direction with respect to the first surface 24a of the sensor substrate 24 (hereinafter, also simply referred to as the normal direction of the sensor substrate 24). Further, when the ultrasonic element 25 receives the reception wave, the diaphragm portion 27 vibrates to charge the piezoelectric element 28 based on the vibration. Therefore, when the ultrasonic element 25 receives the reception wave, it outputs a detection signal corresponding to the reception wave.

The support member 30 is a member that fixes and supports the transducer unit 20. In the present embodiment, the support member 30 is composed of a multilayer board, a printed circuit board, or the like. Although not particularly shown, various circuit components for signal processing may be mounted.

Further, the support member 30 of the present embodiment has a shape including (i) a concave portion 31 and (ii) a convex portion 32 formed so as to surround the concave portion 31. The sensor substrate 24 is mounted on the concave portion 31 via a joining member 33 so that the second surface 24b of the sensor substrate 24 is opposite the bottom surface of the concave portion 31. A silicone-based adhesive or the like is used for the joining member 33.

A pad portion 34 is formed on the convex portion 32 of the support member 30. The pad portion 34 is electrically connected to the pad portion 29 formed on the sensor substrate 24 via a bonding wire 35.

Further, the support member 30 is provided with a metal connection terminal 36 so as to penetrate the convex portion 32 and the pad portion 34. Then, the connection terminal 36 is mechanically connected to the support member 30 and electrically connected to the pad portion 34 by forming a joining member 37 such as solder. As a result, the respective ultrasonic elements 25 are connected to the connection terminal 36 via the pad portions 29 and 34. Further, on the pad portion 34, a solder resist 38 is arranged between a portion connected to the bonding wire 35 and a portion connected to the joining member 37.

The housing 40 is made of metal or the like. The housing 40 is provided with a plurality of through holes 41 corresponding to the number of connection terminals 36 provided in the support member 30. The support member 30 is arranged on the housing 40 via the joining member 42 so that the connection terminal 36 penetrates the through hole 41. The through hole 41 is filled with an insulating member (not shown) for insulating the connection terminal 36 and the housing 40. Further, a silicone-based adhesive or the like is used for the joining member 42; an epoxy resin, a sealing glass or the like is used as the insulating member.

Figure 4:
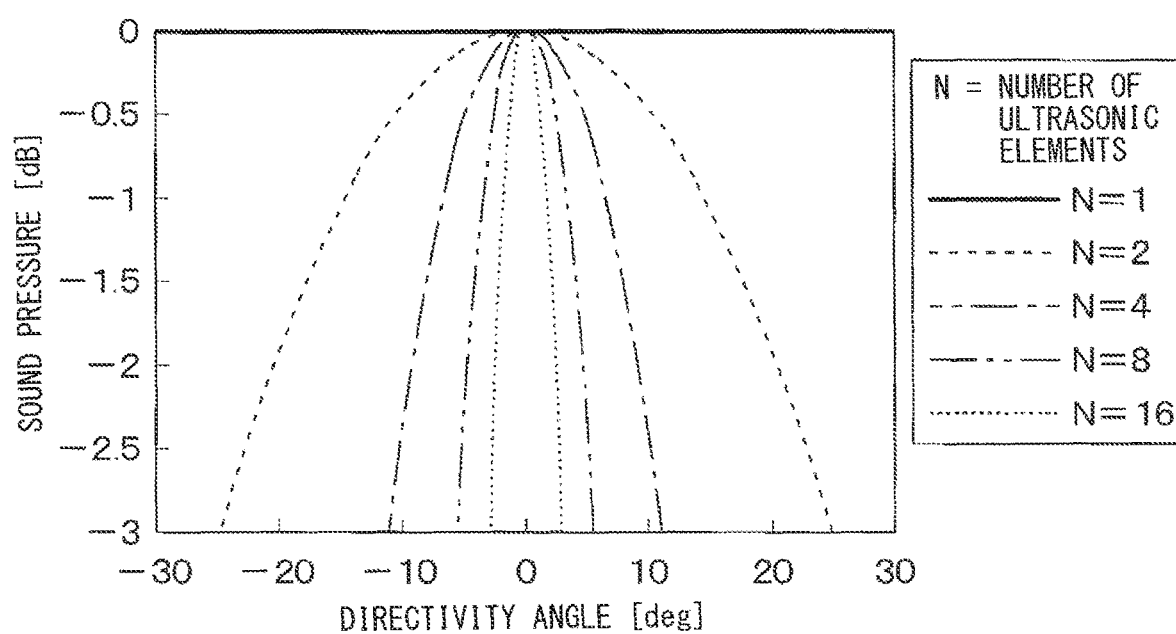
FIG. 4 is a diagram which shows a relationship between the number of ultrasonic elements, a directivity angle, and a sound pressure.

The above is the configuration of the ultrasonic sensor 10 in this embodiment. Here, as shown in FIG. 4, it is confirmed that the directivity angle of the ultrasonic sensor 10 as described above can be easily changed by changing the number of the ultrasonic elements 25. Specifically, the ultrasonic sensor 10 can narrow the directivity angle as the number of ultrasonic elements 25 increases, and can widen the directivity angle as the number of ultrasonic elements 25 decreases. Further, as the number of ultrasonic elements 25 increases, the ultrasonic sensor 10 can increase the sound pressure and detect even a distant obstacle.

Therefore, it is preferable that the number of ultrasonic elements 25 formed in the ultrasonic sensor 10 is appropriately changed based on the height to which the ultrasonic sensor 10 is attached, the detection range, and the like. In this case, the directivity angle of the exploration wave may be adjusted by forming a large number of ultrasonic elements 25 and controlling, among the large number of ultrasonic elements 25, the number of the ultrasonic elements 25 to be energized.

Then, such an ultrasonic sensor 10 is provided so that the normal direction of the sensor substrate 24 is parallel to the horizontal direction when the ultrasonic sensor 10 is provided in the vehicle 1. That is, when the directivity axis agrees with the normal direction, the ultrasonic sensor 10 is provided so that the directivity axis is parallel to the horizontal direction. The horizontal direction is a direction parallel to the horizontal plane. Then, the ultrasonic sensor 10 transmits an exploration wave toward the outside of the vehicle 1.

The controller unit 100, which may also be referred to as a controller, includes a CPU (not shown), a storage unit such as a ROM, a RAM, and a non-volatile RAM. The controller unit is included in an in-vehicle ECU, for instance. Here, CPU is an abbreviation for Central Processing Unit, ROM is an abbreviation for Read Only Memory, RAM is an abbreviation for Random Access Memory, and ECU is an abbreviation for Electronic Control Unit.

Then, the controller unit 100 realizes various control operations by the CPU reading a program (that is, each routine described later) from the ROM or the non-volatile RAM and executing the program. Various data (for example, initial values, lookup tables, maps, etc.) used when executing a program are stored in advance in a storage unit such as a ROM or a non-volatile RAM. Further, the storage medium such as ROM is a non-transitory tangible storage medium.

Specifically, the controller unit 100 is connected to the ultrasonic sensor 10. Then, the controller unit 100 controls the ultrasonic sensor 10 to transmit the exploration wave from the ultrasonic sensor 10. Then the controller unit 100 derives an obstacle distance L to an obstacle and an obstacle height h of the obstacle based on the reception wave received by the ultrasonic sensor 10 after transmitting the exploration wave, and performs a predetermined process.

Hereinafter, a method executed by the controller unit 100 in the present embodiment for deriving an obstacle distance L and an obstacle height h will be described with reference to FIGS. 5 to 12. In the following, a derivation method using an ultrasonic sensor 10 attached to the right side of the vehicle 1 will be described as an example. However, the same applies to the derivation method using the ultrasonic sensor 10 attached to the left side, the front side, or the rear side of the vehicle 1. Further, an example in which an obstacle 200 exists on the road surface 300 parallel to the horizontal plane will be described below. That is, in the present embodiment, assuming that the distance between the ultrasonic sensor 10 (that is, the vehicle 1) and the obstacle 200 along the horizontal direction is L, the obstacle distance L is thereby equal to the distance L. Further, in the following, the height from the road surface 300 to the ultrasonic sensor 10 (that is, the mounting height of the ultrasonic sensor 10) will be described as a sensor mounting height H. The sensor mounting height H is a value adjusted when the ultrasonic sensor 10 is mounted on the vehicle 1, and is a known value.

Further, a reflected wave is generated when an obstacle 200 reflects an exploration wave transmitted from the ultrasonic sensor 10. Of such a reflected wave, the reflected wave along the normal direction of the sensor substrate 24 in the ultrasonic sensor 10 may be referred to as a normal reflected wave; the reflected wave in a direction inclined with respect to the normal direction may be called a multiple reflected wave. In the present embodiment, the ultrasonic sensor 10 is controlled so that the directivity axis is the direction along the normal direction of the sensor substrate 24. Therefore, it can be said that the normal reflected wave is a reflected wave along the directivity axis.

Figure 5:
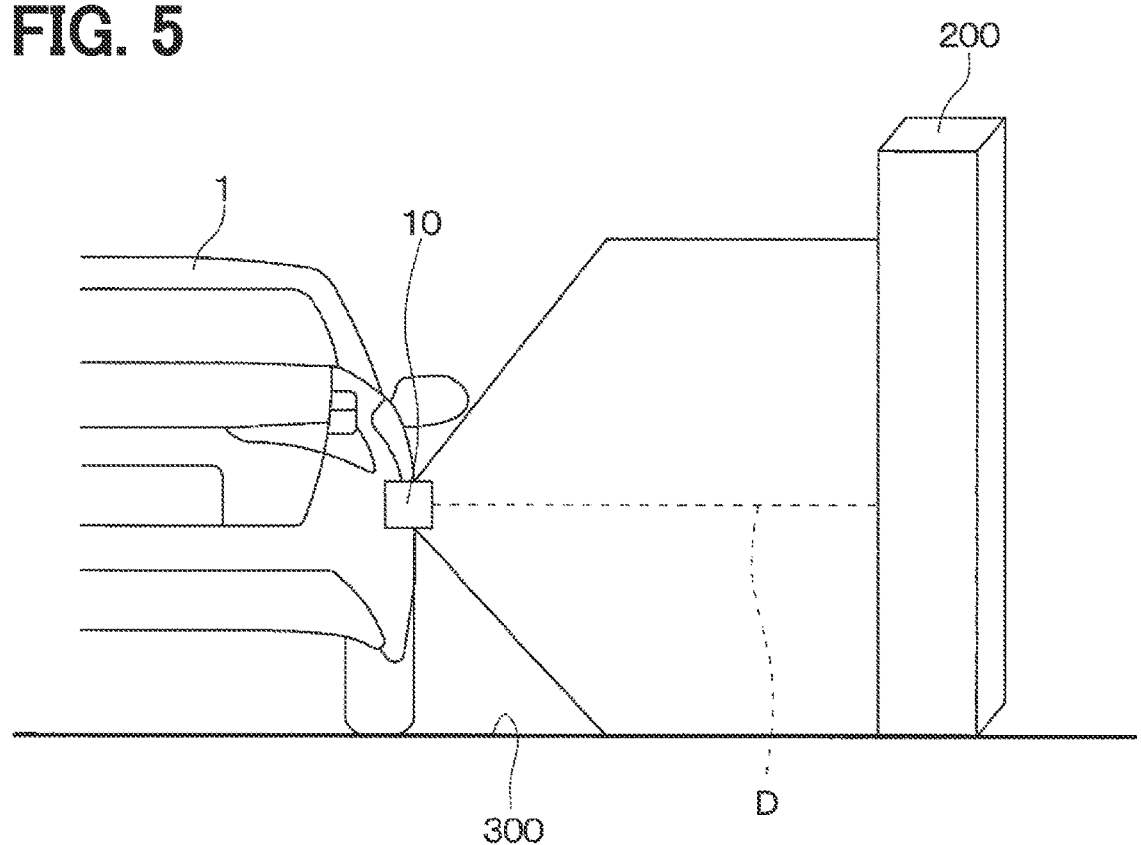
FIG. 5 is a schematic diagram which shows a state which an exploration wave is transmitted from an ultrasonic sensor.

First, the controller unit 100 causes the ultrasonic sensor 10 to transmit an exploration wave. In the present embodiment, as shown in FIG. 5, the exploration wave is transmitted so that the directivity axis D is parallel to the horizontal direction, and the directivity angle is adjusted to, for example, about ±50 degrees.

Figure 6:
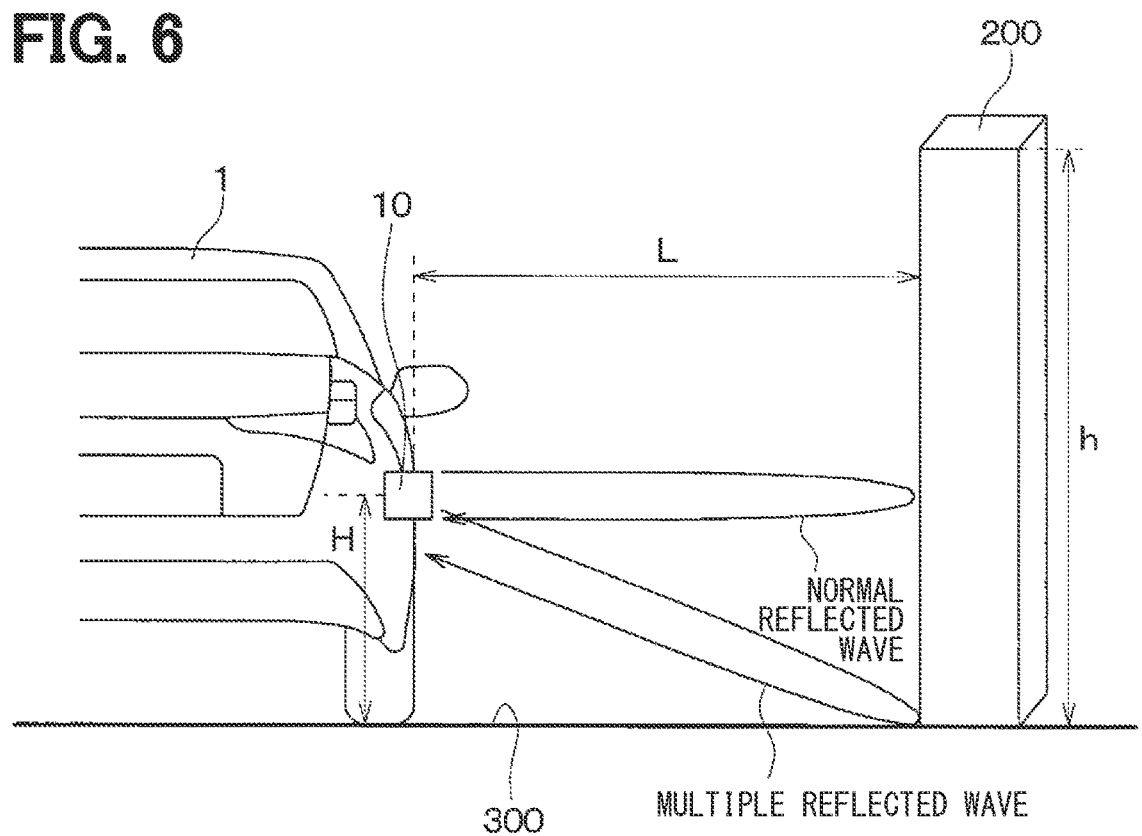
FIG. 6 is a schematic diagram which shows a propagation path of an exploration wave transmitted from an ultrasonic sensor and a reflected wave reflected by a high height obstacle.

Then, when the exploration wave is reflected by the obstacle 200, the ultrasonic sensor 10 receives the reflected wave in ascending order of the propagation distance of the exploration wave and the reflected wave. In this case, as shown in FIG. 6, the propagation distance of the normal reflected wave reaching the ultrasonic sensor 10 is L. In contrast, refer to a multiple reflected wave that is reflected at the boundary between the obstacle 200 and the road surface 300, for example. The propagation distance of such a multiple reflected wave reflected at the boundary and reaching the ultrasonic sensor 10 is $(H^2+L^2)^{1/2}$.

Figure 7:
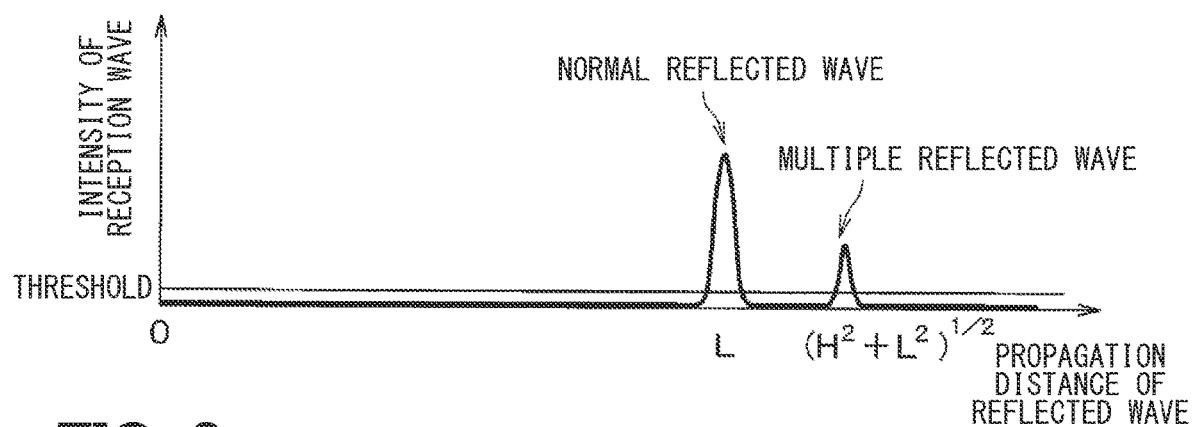
FIG. 7 is a diagram which shows a relationship between a propagation distance of a reflected wave, and an intensity of a reception wave.
Figure 8:
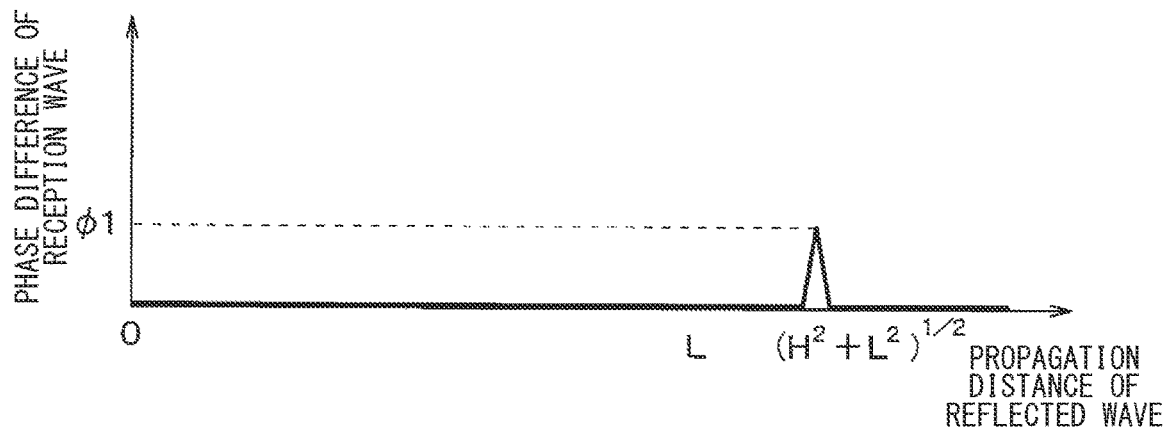
FIG. 8 is a diagram which shows a relationship between a propagation distance of a reflected wave, and a phase difference of a reception wave.

Now define, as a high height obstacle, an obstacle having a height H, which is higher than the height H of the ultrasonic sensor 10. When the obstacle 200, which is such a high height obstacle, is present with the distance L, as shown in FIG. 7, the ultrasonic sensor 10 receives a normal reflected wave and then a multiple reflected wave after the normal reflected wave due to $L<(H^2+L^2)^{1/2}$. Here, such a high height obstacle may also be referred to as a tall obstacle. Further, when the reception wave is a normal reflected wave, as shown in FIG. 8, no phase difference occurs in the reception wave received by each ultrasonic element 25. When the ultrasonic sensor 10 receives a reception wave having an intensity equal to or higher than a predetermined threshold value, the controller unit 100 determines whether or not there is a phase difference in the reception wave received by each ultrasonic element 25. If there is no phase difference, it is determined that the obstacle 200 is a high height obstacle. That is, it is determined that the obstacle height h is equal to or higher than the sensor mounting height H. Further, when the obstacle 200 is a high height obstacle, the obstacle distance L to the obstacle is derived based on the time from the transmission of the exploration wave to the reception of the reception wave.

The threshold value in FIG. 7 is set to a value excluding noise and the like, and the same applies to the threshold value of FIG. 11 described later. Further, as shown in FIG. 8, when the ultrasonic sensor 10 receives the multiple reflected wave, a phase difference occurs in the reception wave received by each ultrasonic element 25. This will be described later because it is the same as the multiple reflected wave from the low height obstacle described later.

Figure 9:
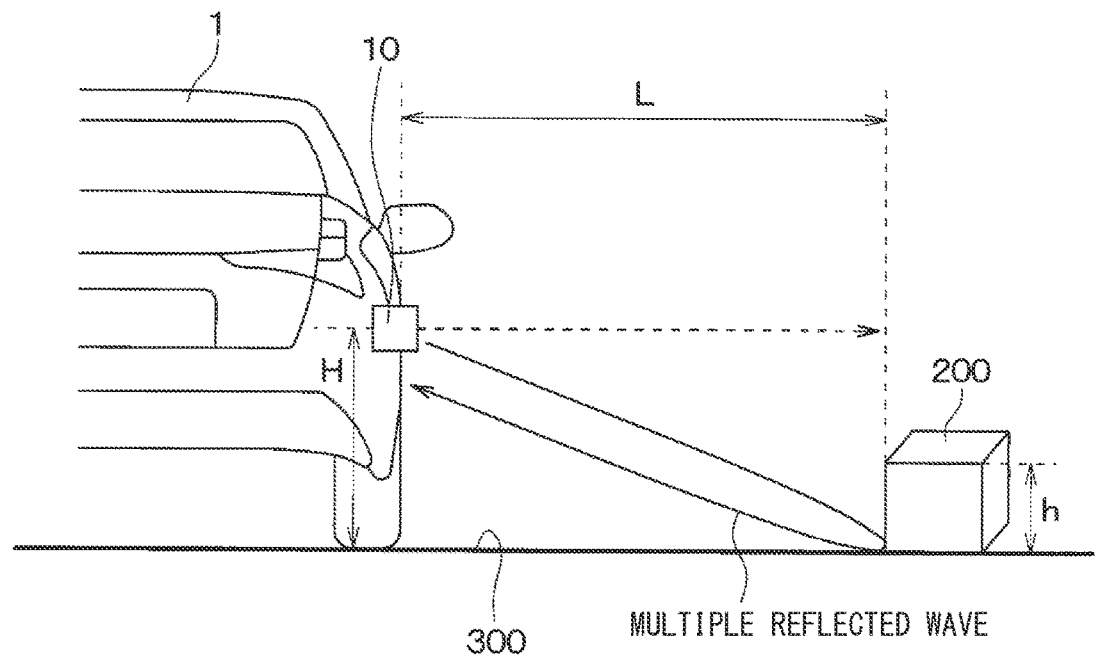
FIG. 9 is a schematic diagram which shows a propagation path of an exploration wave transmitted from an ultrasonic sensor and a reflected wave reflected by a low height obstacle.

Now define, as a low height obstacle, an obstacle having a height h, which is lower than the height H of the ultrasonic sensor 10. When the obstacle 200 is a low height obstacle, as shown in FIG. 9, the ultrasonic sensor 10 receives a multiple reflected wave without receiving a normal reflected wave. Here, such a low height obstacle may also be referred to as a short obstacle. In this case, the ultrasonic sensor 10 receives the reflected wave in the order from the shortest propagation path of the exploration wave and the reflected wave in the multiple reflected wave.

Here, with reference to FIG. 10, three propagation paths are defined as follows. A first propagation path R1 is defined to be a propagation path when the ultrasonic sensor 10 receives a reflected wave reflected by a boundary portion 201 (hereinafter, also simply referred to as the boundary portion) between the obstacle 200 and the road surface 300. Here, the angle between the first propagation path R1 and the road surface 300 is set to θ1. A second propagation path R2 is defined to be a propagation path when the ultrasonic sensor 10 receives a reflected wave reflected by the upper end 202 of the obstacle 200 after being reflected by the road surface 300. Here, the angle formed by the propagation path to the point reflected by the road surface 300 in the second propagation path R2 and the road surface 300 is set to θa A third propagation path R3 is defined to be a propagation path when the ultrasonic sensor 10 receives a reflected wave reflected by the road surface 300 after being reflected by the upper end 202 of the obstacle 200. Here, the second propagation path R2 and the third propagation path R3 have the same distance.

Here, a reference line K is defined to be a virtual line forming an angle of 90 degrees with an incident exploration wave on the second propagation path R2 at the point reflected by the road surface 300. The reference line K can also be referred to as a virtual line that divides each of the first propagation path R1, the second propagation path R2, and the third propagation path R3 into a first portion and a second portion. The first portions of the first propagation path R1, the second propagation path R2, and the third propagation path R3 have the same distance. The second portions that are any remaining portions of the first propagation path R1, the second propagation path R2, and the third propagation path R3 have mutually different distances. Further, the distance between the reference line K in the third propagation path R3 and the upper end 202 of the obstacle 200 is defined as a distance a. The distance between the reference line K in the second propagation path R2 and the upper end 202 of the obstacle 200 is defined as a distance b. The distance between the reference line K in the first propagation path R1 and the boundary portion 201 is defined as a distance c. Then, the horizontal plane passing through the upper end 202 is designated as a virtual horizontal plane 400.

In this case, the second propagation path R2 has the same distance as when totally reflected at the virtual point V1, and the third propagation path R3 has the same distance as when totally reflected at the virtual point V2. The propagation distance of the reflected wave on the first propagation path R1 is represented by the following Expression 1, and the propagation distance of the reflected wave on the second propagation path R2 is represented by the following Expression 2. The propagation distance of the reflected wave on the third propagation path R3 is the same as the propagation distance of the reflected wave on the second propagation path R2, as described above.

Propagation distance of reflected wave on first propagation path $R1=(H^2+L^2)^{1/2}$ [Expression 1]

Propagation distance of reflected wave on second propagation path $R2=(H^2+L^2)^{1/2}-c+(a+b)/2$ [Expression 2]

In this case, the $\{-c+(a+b)/2\}$ term in the second propagation path R2 has a negative value. Therefore, each of the second propagation path R2 and the third propagation path R3 is shorter than the first propagation path R1. Further, the distance of the propagation path including that of the reflected wave reflected at a point between the upper end 202 of the obstacle 200 and the boundary portion 201 is between (i) the first propagation path R1 and (ii) each of the second and third propagation paths R2 and R3.

Figure 11:
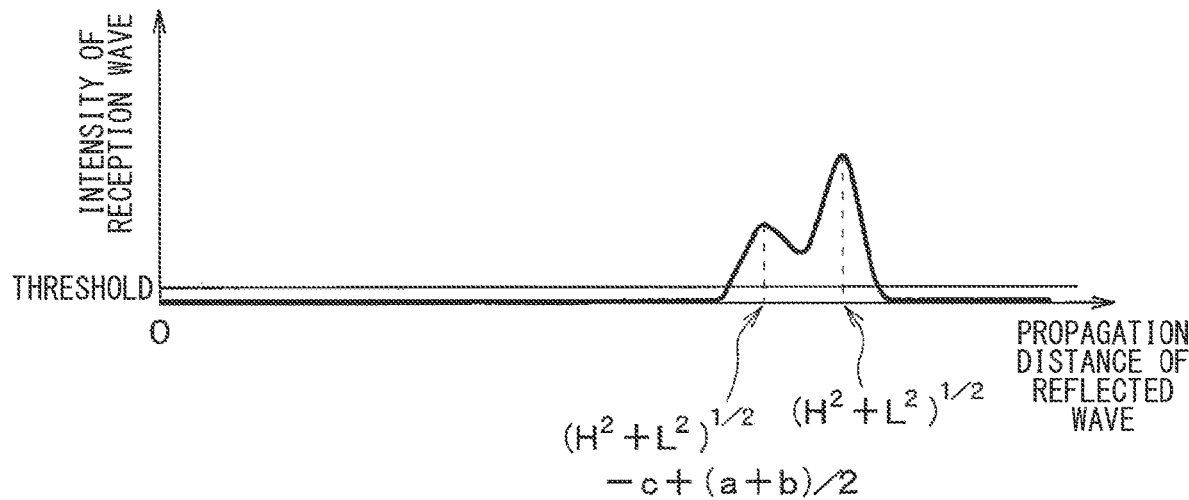
FIG. 11 is a diagram which shows a relationship between a propagation distance of a reflected wave, and an intensity of a reception wave.
Figure 12:
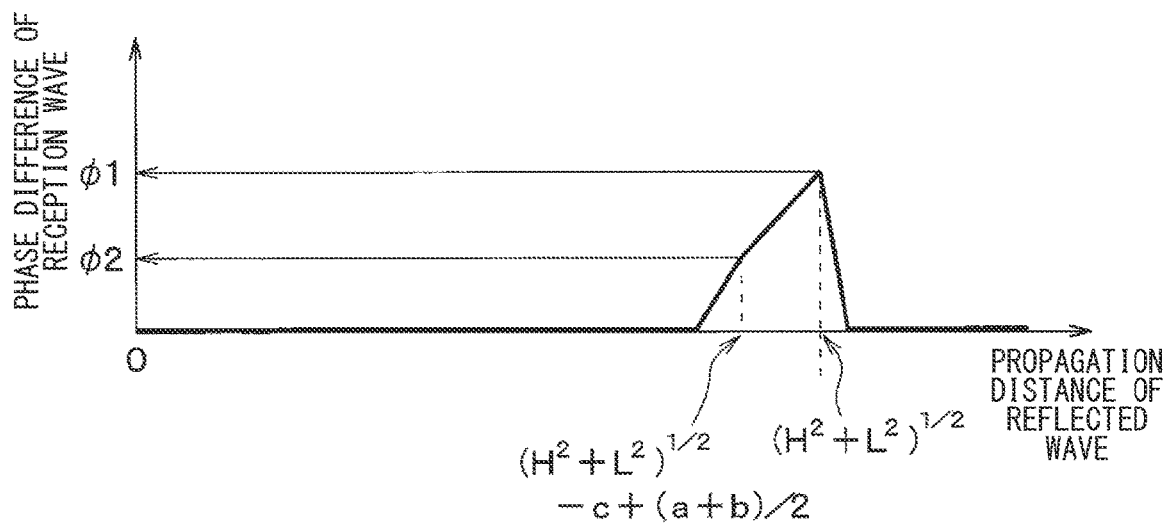
FIG. 12 is a diagram which shows a relationship between a propagation distance of a reflected wave, and a phase difference of a reception wave.

Therefore, as shown in FIG. 11, the ultrasonic sensor 10 first receives the reflected wave of the second propagation path R2 and the third propagation path R3, and then receives the reflected wave of the first propagation path R1. Further, as shown in FIG. 12, since the multiple reflected wave is a reflected wave from a direction inclined with respect to the normal direction of the sensor substrate 24 of the ultrasonic sensor 10, a phase difference occurs in the reception wave received by each ultrasonic element 25.

In this case, assuming that the phase difference when the reflected wave in the first propagation path R1 is received is φ1 and the wavelength of the exploration wave is λ, the phase difference φ1 is expressed by the following Expression 3. Similarly, assuming that the phase difference when the reflected wave in the second propagation path R2 or the third propagation path R3 is received is φ2, the phase difference φ2 is expressed by the following Expression 4. In the present embodiment, the phase difference φ1 corresponds to a first phase difference, and the phase difference φ2 corresponds to a second phase difference. Further, d in the following Expression 3 and Expression 4 is an interval between the centers of the adjacent ultrasonic elements 25 described above.

$\phi 1=2\pi d \sin \theta 1/\lambda$ [Expression 3]

$\phi 2=2\pi d \sin \theta 2/\lambda$ [Expression 4]

Since the angle between (i) the reflected wave reflected at the boundary portion 201 and (ii) the road surface 300 is indicated by θ1, the angle θ1 is expressed by the following Expression 5 when the obstacle height h and the obstacle distance L are used. Further, since the angle between (i) the virtual horizontal plane 400 passing through the upper end 202 and (ii) the reflected wave reflected at the upper end 202 in the second propagation path R2 is indicated by θ2, the angle θ2 is expressed by the following Expression 6.

$\theta 1=\tan^{-1}(H/L)$ [Expression 5]

$\theta 2=\tan^{-1}\{(H-h)/L\}$ [Expression 6]

Therefore, when the controller unit 100 receives the multiple reflected wave without receiving the normal reflected wave, the controller unit 100 derives the obstacle height h and the obstacle distance L as follows. That is, the controller unit 100 derives the obstacle height h and the obstacle distance L using (i) the phase difference φ2 where the intensity of the reception wave peaks after the multiple reflected wave exceeds the threshold value, (ii) the phase difference φ1 where the intensity of the reception wave peaks again after the intensity of the reception wave decreases, and (iii) the above Expressions 3 to 6.

Specifically, the controller unit 100 derives the angle θ1 based on the above Expression 3 by using the phase difference φ1 of the reception wave. Then, the controller unit 100 derives the obstacle distance L based on the above Expression 5 by using the derived angle θ1 and the known sensor mounting height H. Subsequently, the controller unit 100 derives the angle θ2 based on the above Expression 4 by using the phase difference φ2 of the reception wave. Then, the controller unit 100 derives the obstacle height h based on the Expression 6 by using the derived angle θ2, the obstacle distance L, and the known sensor mounting height H. As a result, the obstacle distance L and the obstacle height h are derived.

Then, the controller unit 100 performs a predetermined process based on the derived obstacle distance L and the obstacle height h.

Figure 13:
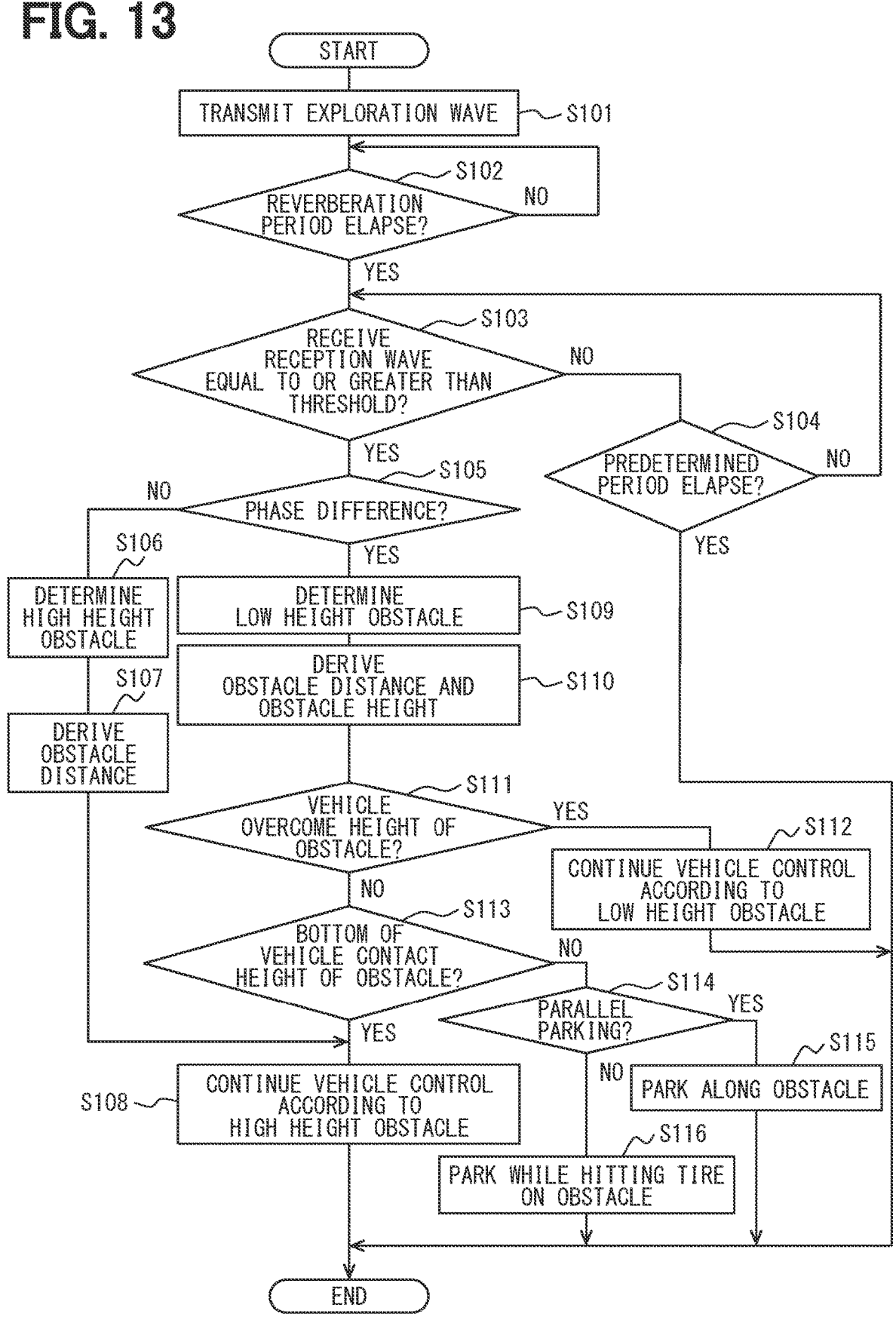
FIG. 13 is a flowchart which shows a process executed by a controller unit.

The above is the configuration of the obstacle detection apparatus in this embodiment. Next, the process executed by the controller unit 100 in the obstacle detection apparatus will be described with reference to FIG. 13. In the following, an example of performing a parking assistance control using an obstacle detection apparatus will be described. Further, although not particularly shown, the controller unit 100 is appropriately connected to each unit for performing the parking assistance control, such as a brake unit, a power train unit, and a steering unit mounted on the vehicle 1.

Then, for example, when the automatic parking switch or the like mounted on the vehicle 1 is operated by the occupant, the controller unit 100 controls the brake unit or the like while detecting an obstacle to perform a predetermined parking assistance control. The predetermined parking assistance control includes, for example, a process of detecting a parking space, an angle adjustment process of changing the direction of the vehicle for parking the vehicle in the detected parking space, a parking process of parking the vehicle in the detected parking space, and the like.

First, the controller unit 100 controls the ultrasonic sensor 10 in step S101 to transmit a pulsed exploration wave. Next, in step S102, the controller unit 100 determines whether or not the reverberation period due to the transmission of the exploration wave has elapsed. Then, when the controller unit 100 determines that the reverberation period has not elapsed (that is, step S102: NO), the controller unit 100 performs the process of step S102 again. That is, the controller unit 100 waits until the reverberation period elapses. The reverberation period is a period during which the vibration of the ultrasonic element 25 remains due to the transmission of the exploration wave.

When the controller unit 100 determines that the reverberation period has elapsed (that is, step S102: YES), the controller unit 100 determines in step S103 whether or not a reception wave equal to or greater than the threshold value has been received. Then, when it is determined that the reception wave equal to or greater than the threshold value has not been received (that is, step S103: NO), the controller unit 100 determines in step S104 whether or not the predetermined period has elapsed. The predetermined period is set according to the desired detection range of the obstacle 200 and the like. For example, when the detection range is 5 m, the controller unit 100 sets the predetermined period to 30 msec based on (5×2)/sound velocity.

When the controller unit 100 determines that the predetermined period has not elapsed (that is, step S104: NO), the controller unit 100 performs the processing of step S103 and subsequent steps again. That is, when the controller unit 100 does not receive the reception wave equal to or greater than the threshold value, the controller unit 100 repeats the processes after step S103 until a period in which the reception wave may be received. On the other hand, when the controller unit 100 determines that the predetermined period has elapsed (that is, step S104: YES), the controller unit 100 ends the process.

When the controller unit 100 determines that the reception wave equal to or greater than the threshold value has been received (that is, step S103: YES), the controller unit 100 determines whether or not there is a phase difference in the reception waves received by each ultrasonic element 25 in step S105. That is, the controller unit 100 determines whether the received reception wave is a normal reflected wave or a multiple reflected wave. When the controller unit 100 determines that the received reception wave has no phase difference (that is, step S105: NO), the reception wave is determined to be a normal reflected wave. Therefore, in step S106, it is determined that a high height obstacle is present.

Then, the controller unit 100 derives the obstacle distance L in step S107. In this case, the controller unit 100 derives the obstacle distance L based on the time from the transmission of the exploration wave to the reception of the reception wave and the sound velocity. Then, in step S108, the controller unit 100 determines that a high height obstacle is present at the obstacle distance L, and continues vehicle control.

On the other hand, when the controller unit 100 determines in step S105 that the received reception wave has a phase difference (that is, step S105: YES), the reception wave is determined to be a multiple reflected wave. Therefore, in step S109, it is determined that a low height obstacle is present.

As shown in FIGS. 7 and 8, the ultrasonic sensor 10 can receive multiple reflected waves even when the obstacle 200 is a high height obstacle. However, in the case of a high height obstacle, the ultrasonic sensor 10 receives the normal reflected wave before the multiple reflected wave. Further, in the case of a high height obstacle, when the controller unit 100 determines that a signal equal to or higher than the threshold value of the reception wave is received in step S103, the controller unit 100 determines that there is no phase difference in step S105. The processing after step S106 is performed to end this process. Therefore, it is determined in step S105 that there is a phase difference only in the case of a low height obstacle.

Then, the controller unit 100 derives the obstacle distance L and the obstacle height h in step S110. In the present embodiment, as described above, the obstacle distance L and the obstacle height h are derived by using the phase difference φ1 and the phase difference φ2 of the reception wave and the above Expressions 3 to 6.

Subsequently, in step S111, the controller unit 100 determines whether or not the obstacle height h is lower than the height that the vehicle 1 can overcome. Then, when the controller unit 100 determines that the height is lower than the height that can be overcome (that is, step S111: YES), the controller unit 100 determines in step S112 that a low height obstacle is present at the obstacle distance L, to continue vehicle control. The height that can be overcome is appropriately set according to the vehicle type and the like, and is set to, for example, 5 cm. Further, examples of the 5 cm obstacle include bumps and the like.

When the controller unit 100 determines that the height is not overcomeable (that is, step S111: NO), the controller unit 100 determines in step S113 whether or not the obstacle height h is the height at which the bottom surface of the vehicle body contacts. For example, in order to determine whether or not the bottom surface of the vehicle body is in contact with the obstacle, the controller unit 100 determines whether or not the obstacle height h is the height at which the bumper of the vehicle body is in contact. In this case, the controller unit 100 determines, for example, whether or not the obstacle height h is lower than 20 cm.

When the controller unit 100 determines that the height is such that the bottom surface of the vehicle body does not contact (that is, step S113: NO), the controller unit 100 parks the vehicle according to the parking mode. For example, the controller unit 100 determines in step S114 whether or not the parallel parking is to be performed. Then, when the controller unit 100 determines that the parallel parking is to be performed (that is, step S114: YES), in step S115, the controller unit 100 performs the process for parking the vehicle 1 by bringing the vehicle 1 close to the obstacle 200 to be along the obstacle 200, and ends the process. In this case, the obstacle 200 is, for example, a curb.

On the other hand, when the controller unit 100 determines that parallel parking is not to be performed (that is, step S114: NO), that is, when it is determined that side-by-side parking is to be performed, in step S116, the controller unit 100 performs the process for parking the vehicle 1 by hitting the tire against the obstacle 200 and ends the process. In this case, the obstacle 200 is, for example, a tire stopper block. The side-by-side parking is a parking mode in which the host vehicle is parked along a different vehicle in the vehicle width direction such that the lateral side of the different vehicle faces the lateral side of the host vehicle. The parallel parking is a parking mode in which the host vehicle is parked along a different vehicle in the vehicle front-rear direction such that the front side of one of the different vehicle and the host vehicle faces the rear side of the other of the different vehicle and the host vehicle.

Further, when the controller unit 100 determines that the obstacle height h is the height at which the bottom surface of the vehicle body contacts (that is, step S113: YES), the controller unit 100 performs the same processing as in step S108 and ends the process.

In the present embodiment described above, the controller unit 100 derives the obstacle distance L and the obstacle height h by using the phase differences φ1 and φ2 of the reception wave received by each of the plurality of ultrasonic elements 25. When the obstacle 200 is a high height obstacle, no phase difference occurs in the reception waves received by the plurality of ultrasonic elements 25. Therefore, the controller unit 100 can suppress an erroneous detection in which when a plurality of low height obstacles having different distances from the ultrasonic sensor 10 exist close to each other, such a plurality of low height obstacles are erroneously detected as a high height obstacle.

Further, when the obstacle 200 is a low height obstacle, the controller unit 100 controls the vehicle according to the low height h of the obstacle, so that the vehicle control can be suitably executed.

Further, the ultrasonic sensor 10 is a MEMS type configured by using the sensor substrate 24. Therefore, mass production can be facilitated.

The ultrasonic elements 25 in the ultrasonic sensor 10 are provided such that the interval d between the centers of adjacent ultrasonic elements 25 is less than half of the wavelength of the exploration wave. Therefore, it is possible to suppress the binarization of the orientation with respect to a certain phase difference, and it is possible to suppress the decrease in the detection range.

Further, in the ultrasonic sensor 10, the number of ultrasonic elements 25 or the number of ultrasonic elements 25 to which a drive voltage is applied is adjusted so as to have a predetermined directivity angle. Therefore, the ultrasonic sensor 10 can achieve a desired directivity angle.

When a lead-free piezoelectric ceramic such as scandium aluminum nitride or aluminum nitride is used as the piezoelectric film 28b of the ultrasonic sensor 10, the ultrasonic sensor 10 with reduced impact on the environment can be realized.

Second Embodiment

A second embodiment will be described. In this embodiment, the obstacle distance L to a low height obstacle and the obstacle height h are derived by another method different from the first embodiment. The remaining configuration is similar to that according to the first embodiment and will thus not be described repeatedly.

Figure 14:
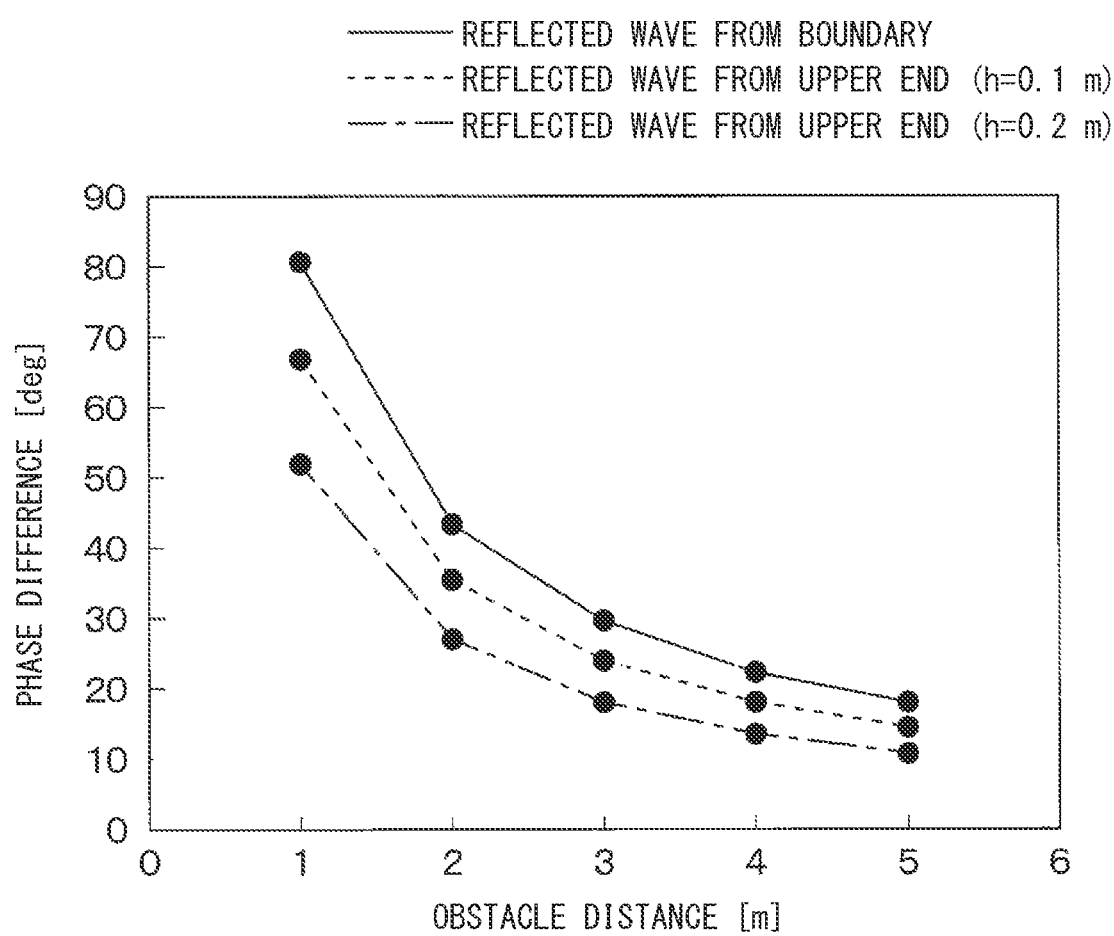
FIG. 14 is a diagram which shows a relationship between an obstacle distance and a phase difference stored in a controller unit according to a second embodiment.

In the present embodiment, regarding the obstacle 200 is a low height obstacle, the relationship between the obstacle distance L, the phase difference φ1, the phase difference φ2, and the obstacle height h is measured in advance and thus known. Then, the controller unit 100 stores information regarding the relationship between the obstacle distance L, the phase difference, and the obstacle height h in a storage unit, as shown in FIG. 14. Note that FIG. 14 illustrates (i) the reflected wave from the boundary portion 201, (ii) the reflected wave from the upper end 202 of the obstacle having a height h of 0.1 m, and (iii) the reflected wave from the upper end 202 of the obstacle having a height h of 0.2 m. However, in reality, the information of the obstacles each having a height up to the sensor mounting height H is stored in more detail. Further, FIG. 14 shows the result when the sensor mounting height H is 0.5 m.

Then, when the obstacle distance L and the obstacle height h are derived in step S110, the controller unit 100 derives the obstacle distance L and the obstacle height h with reference to the phase differences φ1 and φ2 of the reception wave received by each ultrasonic element 25 and the map of FIG. 14.

Specifically, the phase difference φ1 is the phase difference when the reflected wave from the boundary portion 201 is received. Therefore, the controller unit 100 derives the obstacle distance L by using the phase difference φ1 and the map. Further, the phase difference φ2 is the phase difference when the reflected wave reflected by the upper end 202 of the obstacle 200 is received. Therefore, the controller unit 100 derives the obstacle height h using the phase difference φ2, the map, and the derived obstacle distance L.

As described above, even if the obstacle distance L and the obstacle height h are derived using the phase difference φ1, the phase difference φ2, and the map, the same effect as that of the first embodiment can be obtained. In the above, an example of deriving the obstacle distance L using the phase difference φ1 and the map has been described. However, the controller unit 100 may derive the obstacle distance L from the phase difference φ1 using the above Expressions 3 and 5, and derive the obstacle height h using the obstacle distance L, the phase difference φ2, and the map. That is, the obstacle distance L and the obstacle height h may be derived by appropriately combining the first embodiment and the second embodiment.

Third Embodiment

A third embodiment will be described. In this embodiment, the obstacle distance L to a low height obstacle is derived by another method different from the first embodiment. Others are the same as those in the first embodiment, and thus the description thereof will be omitted here.

Figure 10:
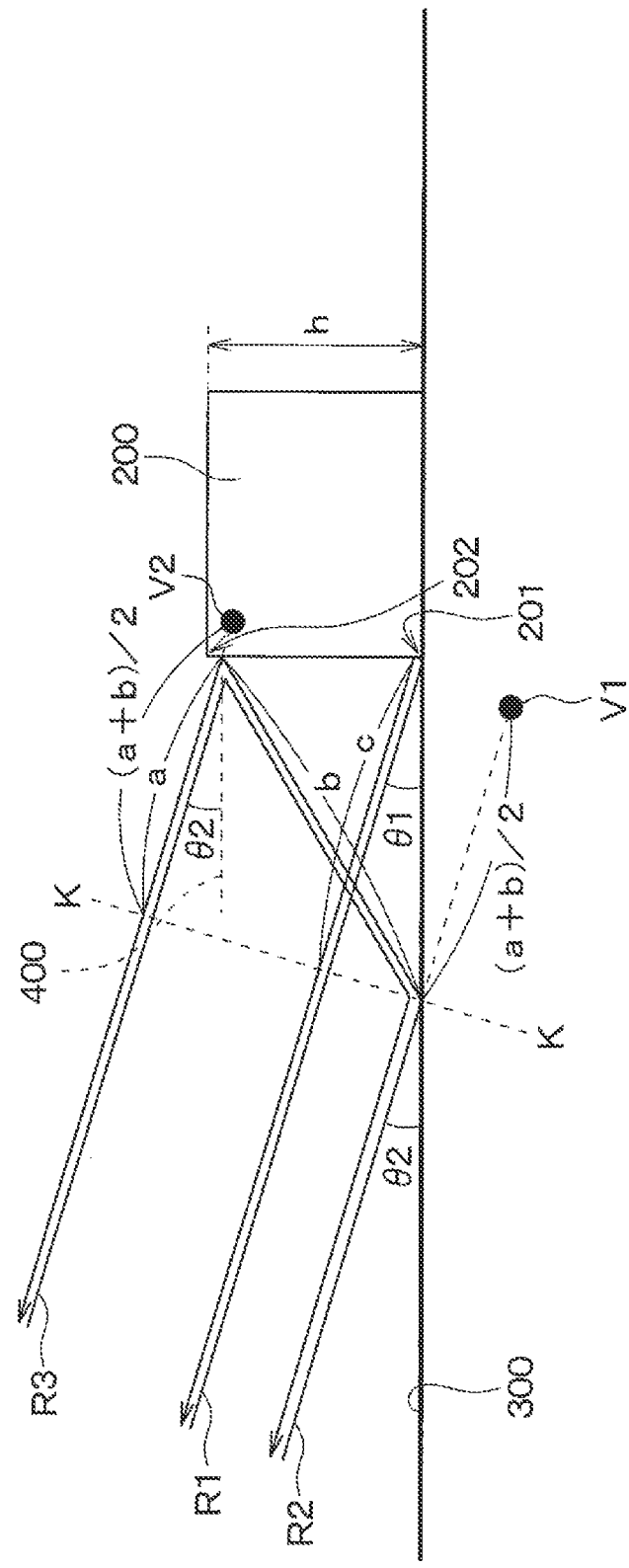
FIG. 10 is a schematic diagram which shows a detailed propagation path of an exploration wave reflected by a low height obstacle and a reflected wave.

First, in FIG. 10 described in the first embodiment, the distance a, the distance b, and the distance c are represented by the following Expressions 7 to 9.

$$a = b \times \cos 2\theta 2 \qquad \text{[Expression 7]}$$
$$= h \times \cos 2\theta 2 / \sin \theta$$

$$b = h / \sin \theta 2 \qquad \text{[Expression 8]}$$

$$c = b \times \cos \theta 2 \times \cos \theta 1 \qquad \text{[Expression 9]}$$
$$= h \times \cos \theta 2 \times \cos \theta 1 / \sin \theta 2$$
$$= h \times \cos \theta 1 / \tan \theta 2$$

The obstacle distance L is also shown by the following Expression 10.

$$L = \{(H^2 + L^2)^{1/2} - c + a\} \times \cos \theta 2 \qquad \text{[Expression 10]}$$

Therefore, in step S110, the controller unit 100 of the present embodiment derives the angle θ1, the angle θ2, and the obstacle height h using the above Expressions 3 to 5, then derives the distance a, the distance b, and the distance c using the above Expressions 7 to 9, and derives the obstacle distance L using the above Expression 10.

As explained above, even when the obstacle distance L is derived using the phase difference φ1, the phase difference φ2, the obstacle height h, the distance a, the distance b, and the distance c, the same effect as that of the first embodiment can be obtained.

Fourth Embodiment

A fourth embodiment will be described. This embodiment is different from the first embodiment in that the obstacle distance L is derived by a plurality of methods and performs a predetermined process assuming that the obstacle 200 exists between the derived obstacle distances L. Others are the same as those in the first embodiment, and thus the description thereof will be omitted here.

Figure 15:
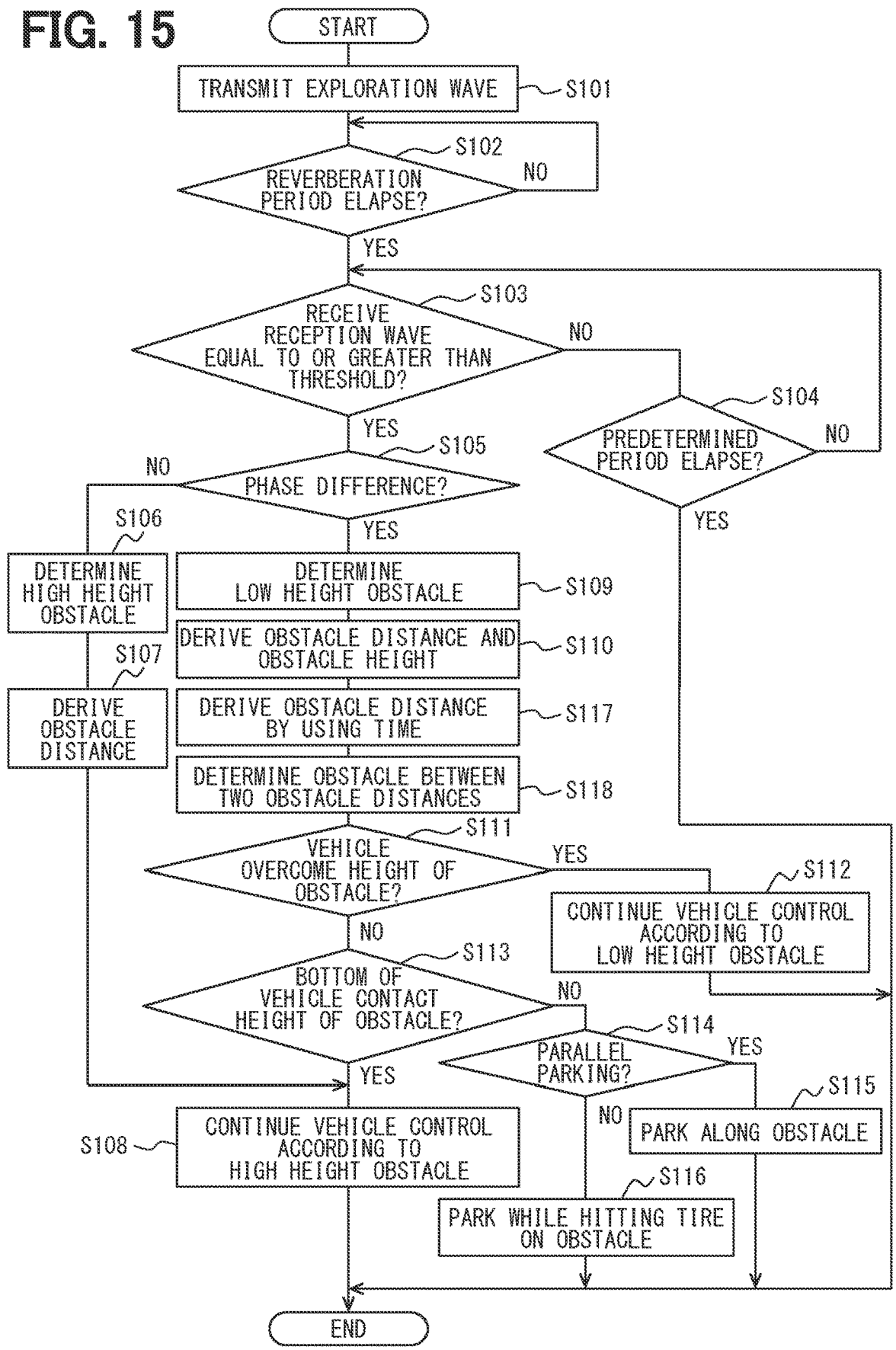
FIG. 15 is a flowchart which shows a process executed by a controller unit according to a fourth embodiment.

The process executed by the controller unit 100 of the present embodiment will be described with reference to FIG. 15. As shown in FIG. 15, when determining in step S105 that the reception wave has a phase difference (that is, step S105: YES), the controller unit 100 derives the obstacle distance L and the obstacle height h in step S110. In this case, in the present embodiment, the controller unit 100 derives the obstacle distance L by using Expressions 7 to 10 described in the third embodiment.

Next, in step S117, the controller unit 100 derives the obstacle distance L using (i) the propagation time from the transmission of the exploration wave to the reception of the reception wave having the phase difference φ1 and (ii) the ToF (abbreviation of Time of flight) method using the sound velocity. Specifically, the controller unit 100 derives the obstacle distance L by {(propagation time/2)×sound velocity×cos θ1}.

Then, in step S118, the controller unit 100 determines that the obstacle 200 is present between the obstacle distance L derived in step S110 and the obstacle distance L derived step S117, and executes step S111 and subsequent steps.

As described above, in the present embodiment, when the obstacle 200 is a low height obstacle, the controller unit 100 derives the obstacle distance L using the phase difference in step S110 and the obstacle distance L by the ToF in step S117. Then, the controller unit 100 determines that the obstacle 200 is present between the two derived obstacle distances L, and executes the control of the vehicle 1. Therefore, the safety can be further improved.

Modified Example of Fourth Embodiment

A modified example of the fourth embodiment will be described. The fourth embodiment has described the method of deriving the obstacle distance L using the method described in the third embodiment in step S110. Note that, in step S110, when the obstacle distance L is derived using the phase difference, the obstacle distance L may be derived by another method. For example, the controller unit 100 may derive the obstacle distance L by the method of the first embodiment, or may derive the obstacle distance L by the method of the second embodiment.

Fifth Embodiment

A fifth embodiment will be described. In this embodiment, the inclination of the road surface 300 is taken into consideration with respect to the first embodiment. Others are the same as those in the first embodiment, and thus the description thereof will be omitted here.

Figure 16:
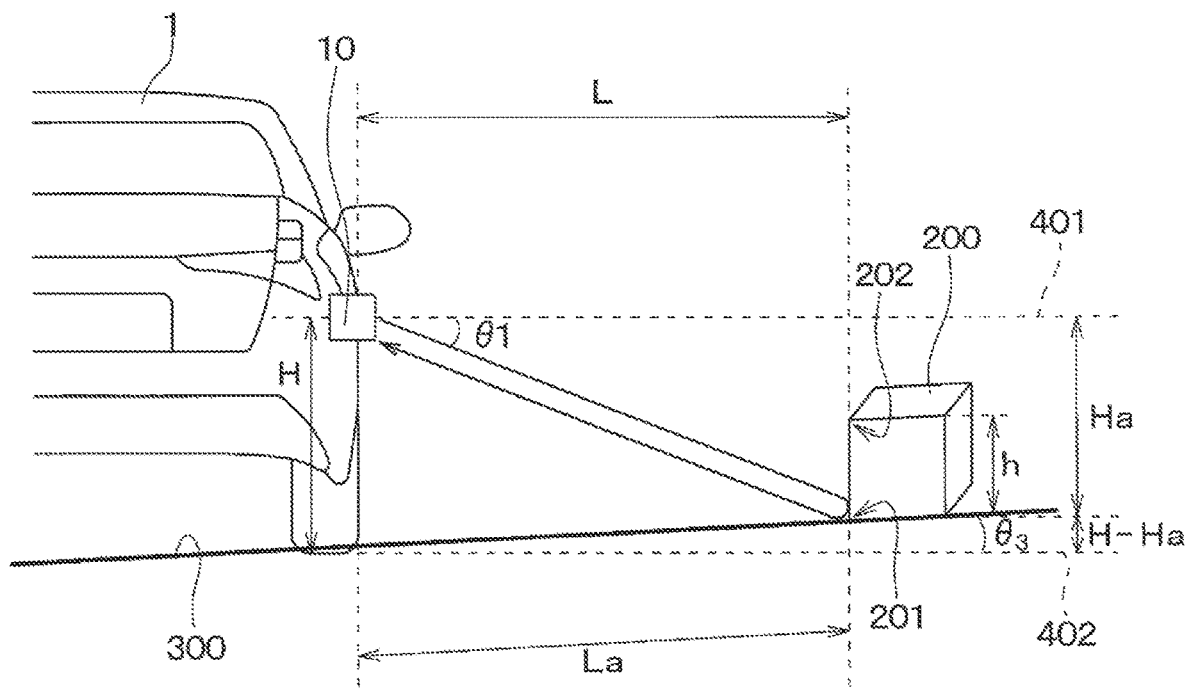
FIG. 16 is a schematic diagram showing a propagation path of an exploration wave transmitted from an ultrasonic sensor and a reflected wave reflected by a low height obstacle according to a fifth embodiment.

First, as shown in FIG. 16, the road surface 300 may be inclined with respect to the horizontal direction. In this case, the distance that the vehicle 1 actually travels to the obstacle 200 is the distance La along the inclined road surface 300. Therefore, in the present embodiment, the corrected obstacle distance La is derived in consideration of the inclination of the road surface 300.

In the present embodiment, as shown in FIG. 16, the distance between the virtual horizontal plane 401 passing through the ultrasonic sensor 10 and the portion of the road surface 300 where the obstacle 200 is arranged is defined as a distance Ha. Further, the distance from the ultrasonic sensor 10 to the obstacle 200 along the virtual horizontal plane 401 is defined as a horizontal distance L. Further, the angle between the virtual horizontal plane 401 and the propagation path of the exploration wave and the reflected wave reflected at the boundary portion 201 is defined as an angle θ1. Then, the angle between the virtual road surface 402 assuming that the road surface 300 is a horizontal plane and the road surface 300 is defined as an angle θ3.

In this case, the controller unit 100 calculates a corrected obstacle distance La as follows. That is, the controller unit 100 first derives the angle θ1 from the phase difference φ1 using the above Expression 3. Further, the controller unit 100 derives $(L^2+Ha^2)^{1/2}$, which is the distance between the ultrasonic sensor 10 and the boundary portion 201, from the propagation time from the transmission of the exploration wave to the reception of the reception wave having the phase difference φ1 and the sound velocity.

Further, Ha=L×tan θ1. The controller unit 100 thus derives the horizontal distance L to the obstacle 200 based on the derived angle θ1 and the distance to the boundary portion 201.

Further, the distance between the road surface 300 where the obstacle 200 is arranged and the virtual road surface 402 is indicated by H−Ha. Therefore, the angle θ3 is represented by the following Expression 11.

$$\theta3=\tan^{-1}\{(H-Ha)/L\} \qquad \text{[Expression 11]}$$

Further, the corrected obstacle distance La is also indicated by La=L/cos M. Therefore, the controller unit 100 can derive the corrected obstacle distance La in consideration of the inclination of the road surface 300 by deriving La=L/cos M.

Figure 17:
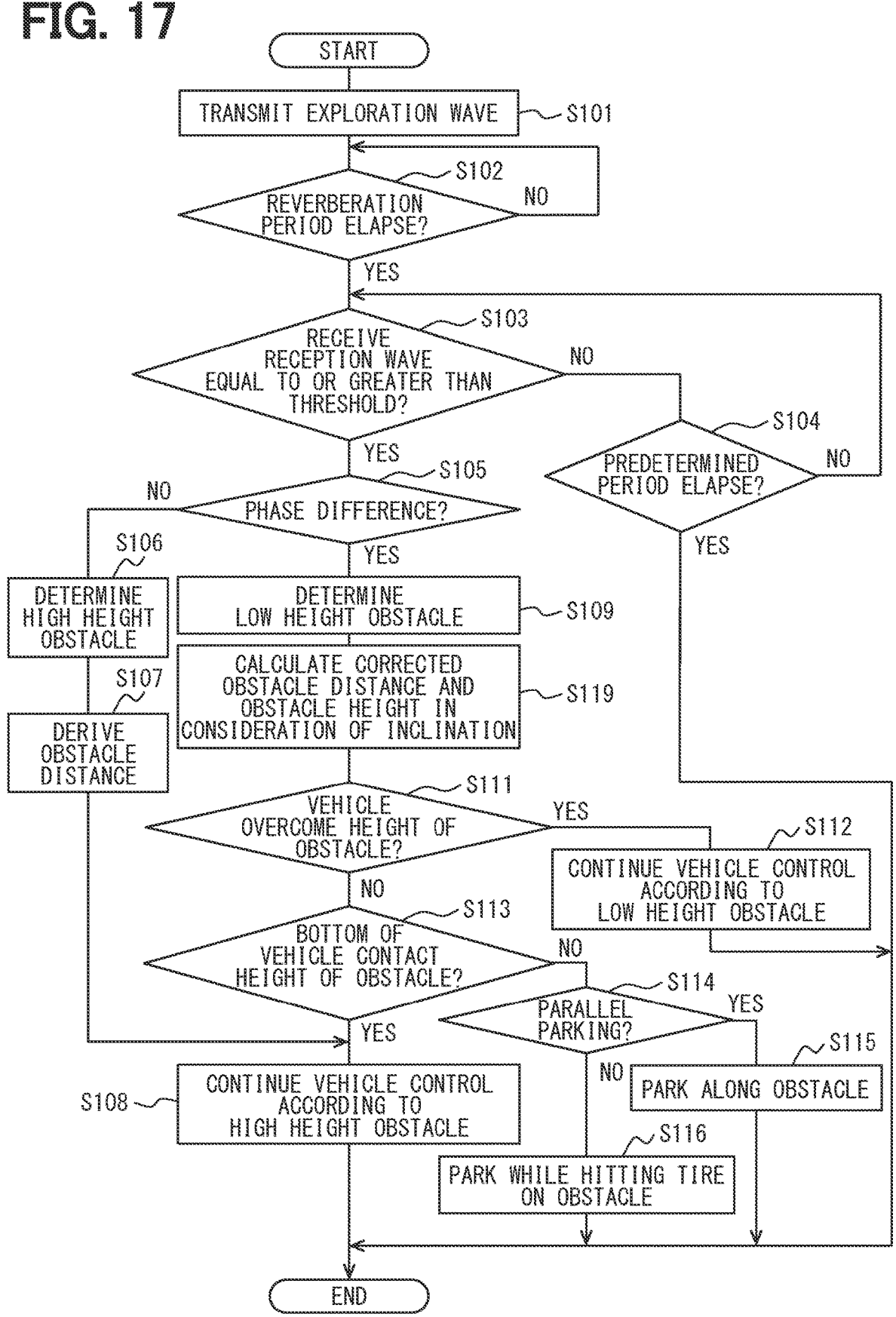
FIG. 17 is a flowchart showing a process executed by a controller unit according to the fifth embodiment.

Next, the process executed by the controller unit 100 of the present embodiment will be described with reference to FIG. 17.

When the controller unit 100 determines in step S105 that there is a phase difference in the reception wave (that is, step S105: YES), the controller unit 100 derives the corrected obstacle distance La in consideration of the inclination of the road surface 300 as described above in step S119. Then, the controller unit 100 derives the obstacle height h by using the derived corrected obstacle distance La and the above Expression 7.

As described above, in the present embodiment, the corrected obstacle distance La and the obstacle height h are derived in consideration of the inclination of the road surface 300. Therefore, the detection accuracy can be further improved. Further, in the present embodiment, the inclination of the road surface 300 (that is, the angle θ3) is derived. Therefore, the inclination can be applied to other devices (for example, image detection) in vehicle control. As a result, the efficiency of vehicle control can be further improved.

Figure 18:
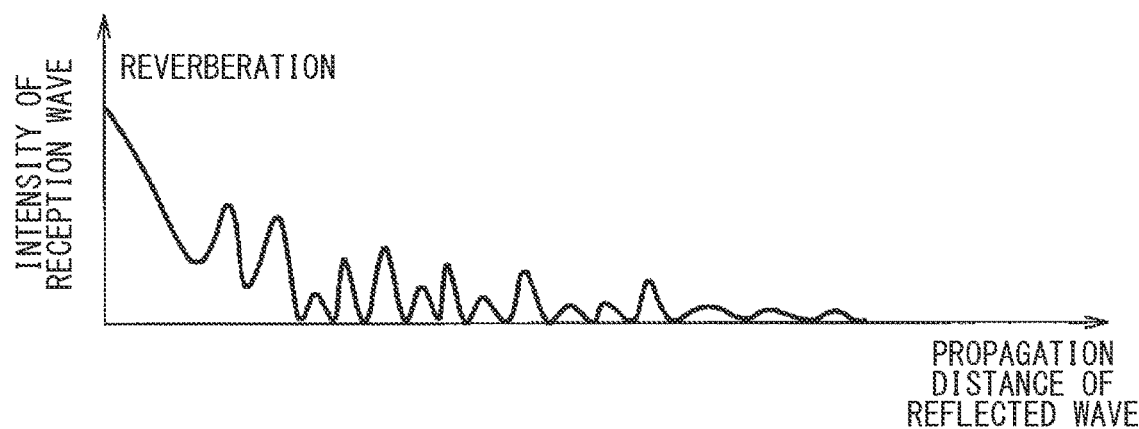
FIG. 18 is a diagram showing a relationship between a propagation distance of a reflected wave and an intensity of a reception wave according to the fifth embodiment.

Here, when the road surface 300 is composed of asphalt or the like, the reflected wave from the road surface 300 becomes random and strong. In this case, assuming that the ultrasonic sensor 10 receives the reflected wave, the intensity of the reception wave has a distribution having random peaks as shown in FIG. 18. Therefore, for example, if an attempt is made to derive the obstacle distance L only by the time until the reflected wave is received, there is a high possibility that false detection will occur.

Figure 19:
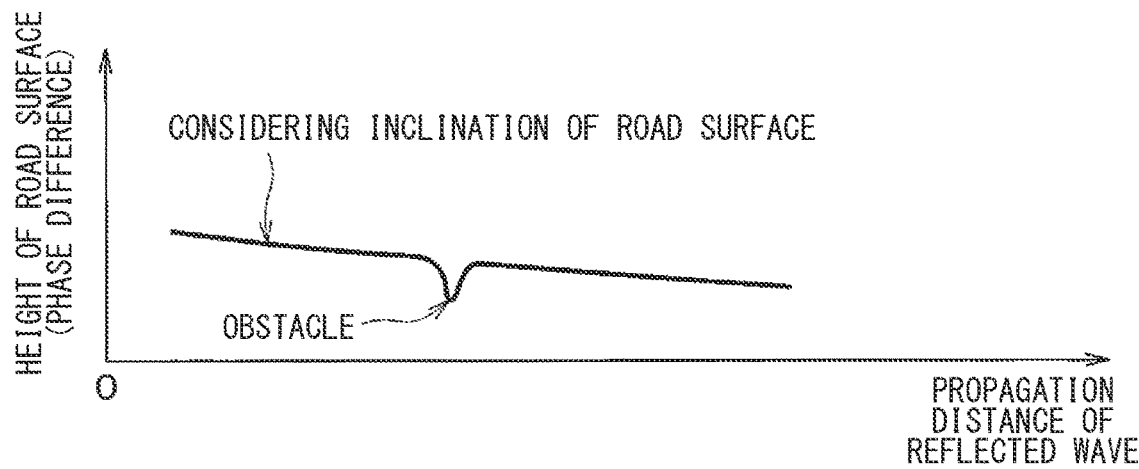
FIG. 19 is a diagram showing a relationship between a propagation distance of a reflected wave and a height of a road surface according to the fifth embodiment.
Figure 20A:
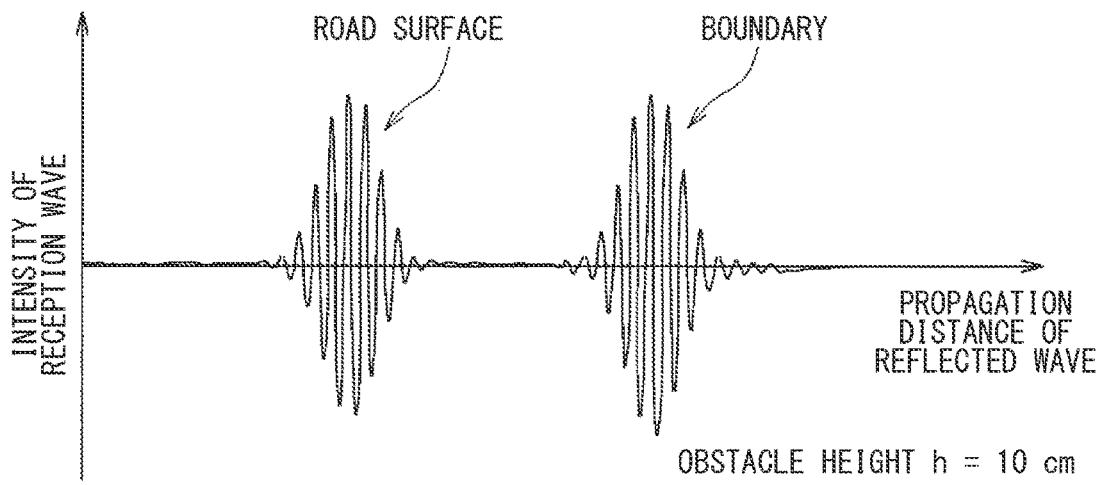
FIG. 20A is a diagram showing a relationship between a propagation distance of a reflected wave and an intensity of a reception wave according to a sixth embodiment.
Figure 20B:
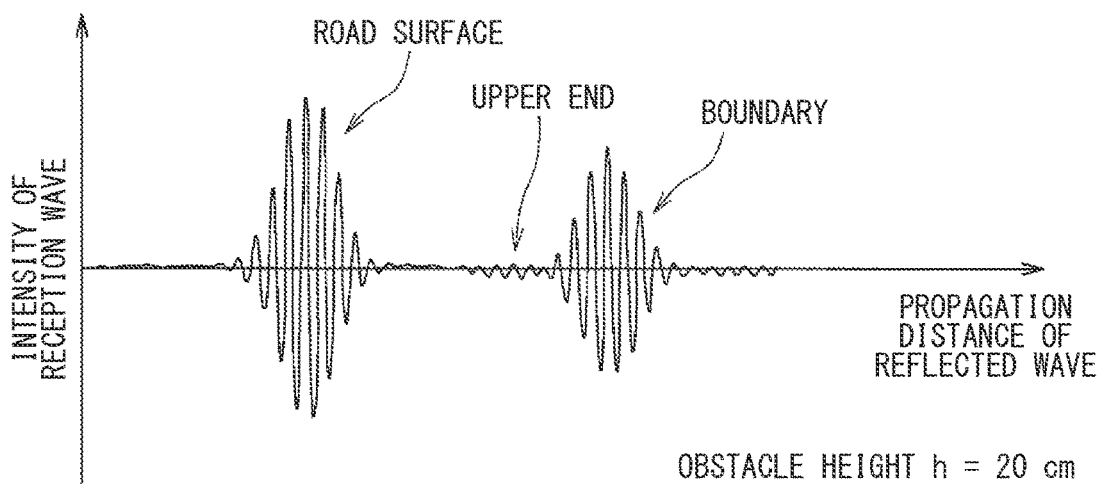
FIG. 20B is a diagram showing a relationship between a propagation distance of a reflected wave and an intensity of a reception wave according to the sixth embodiment.
Figure 20C:
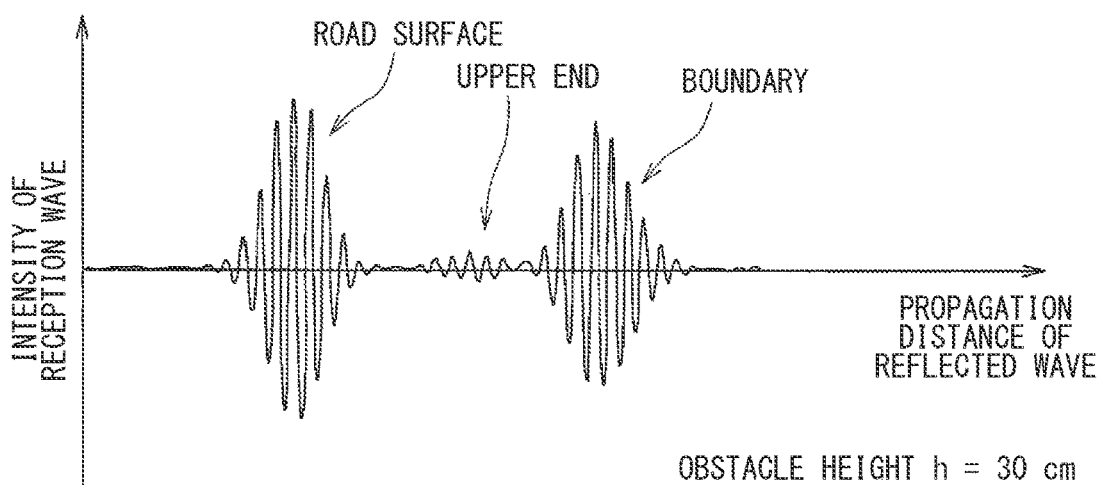
FIG. 20C is a diagram showing a relationship between a propagation distance of a reflected wave and an intensity of a reception wave according to the sixth embodiment.
Figure 20D:
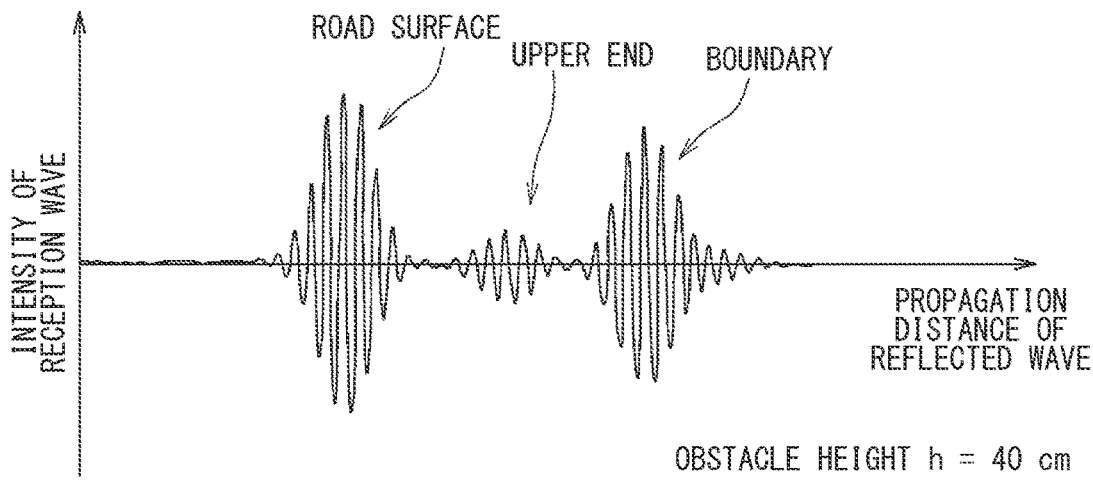
FIG. 20D is a diagram showing a relationship between a propagation distance of a reflected wave and an intensity of a reception wave according to the sixth embodiment.
Figure 20E:
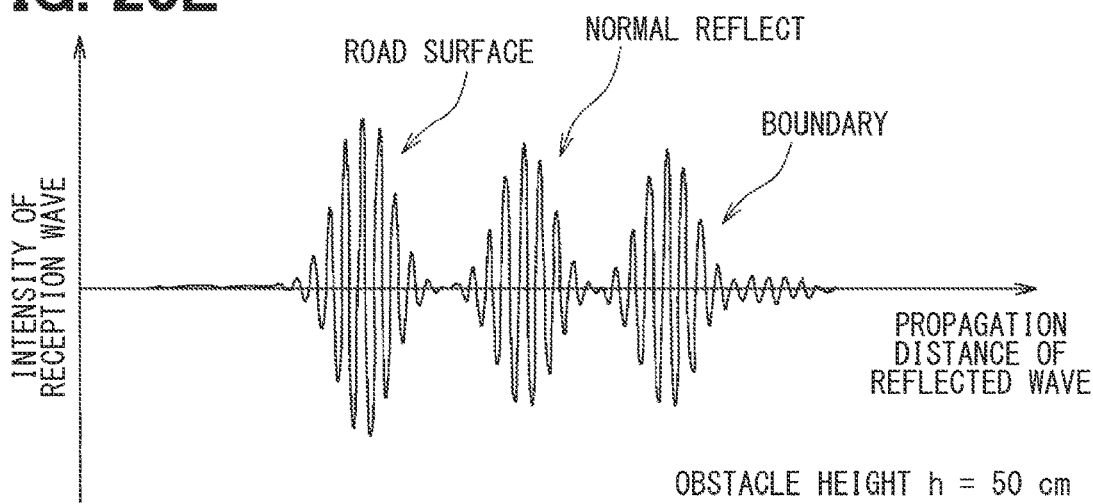
FIG. 20E is a diagram showing a relationship between a propagation distance of a reflected wave and an intensity of a reception wave according to the sixth embodiment.
Figure 20F:
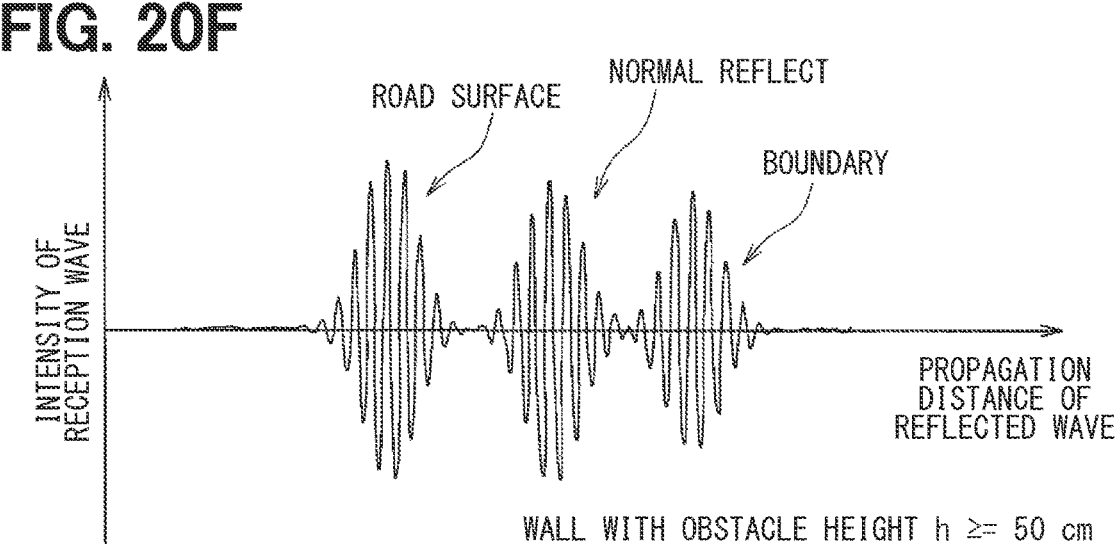
FIG. 20F is a diagram showing a relationship between a propagation distance of a reflected wave and an intensity of a reception wave according to the sixth embodiment.

On the other hand, in the present embodiment, the inclination of the road surface 300 is derived together with the phase difference of the reception wave. Therefore, by taking into account the inclination of the road surface 300 (that is, the difference in the inclination of the road surface 300), the height (phase difference) of the road surface 300 has a shape having a peak at a low height obstacle as shown in FIG. 19. Therefore, according to the present embodiment, even when the reflected wave of the road surface 300 is strong, it is possible to suppress erroneous detection.

Sixth Embodiment

A sixth embodiment will be described. In this embodiment, the drive voltage applied to the ultrasonic sensor 10 is changed from that of the first embodiment. Others are the same as those in the first embodiment, and thus the description thereof will be omitted here.

First, the relationship between the intensity of the reception wave and the height h of the obstacle will be described with reference to FIGS. 20A to 20F. Here, 20A to 20F are the results of simulations when the sensor mounting height H is 45 cm, the obstacle distance L is 75 cm, a drive voltage of 10 KHz is applied to the sound source, and the sound source is set to a low sound source to lose directivity.

As shown in FIGS. 20A to 20F, it is confirmed that the lower the obstacle height h, the lower the intensity when the reflected wave reflected by the upper end 202 of the obstacle 200 is received. That is, the lower the obstacle height h, the smaller the SN ratio, which is the ratio of the signal and the noise, and the lower the sensitivity.

In the present embodiment, the controller unit 100 controls the phase of the drive voltage (that is, the AC voltage) applied to each ultrasonic element 25. As a result, the directivity axis D of the exploration wave transmitted from the ultrasonic sensor 10 is changed. Specifically, as shown in FIG. 21, the controller unit 100 transmits the exploration wave so that the directivity axis D is inclined toward the road surface 300 with respect to the horizontal direction.

According to this, even when the obstacle 200 is a low height obstacle, the intensity of the reception wave can be increased and the sensitivity can be improved.

Seventh Embodiment

A seventh embodiment will be described. This embodiment defines the sensor mounting height H of the ultrasonic sensor 10 with respect to the first embodiment. Others are the same as those in the first embodiment, and thus the description thereof will be omitted here.

Figure 22A:
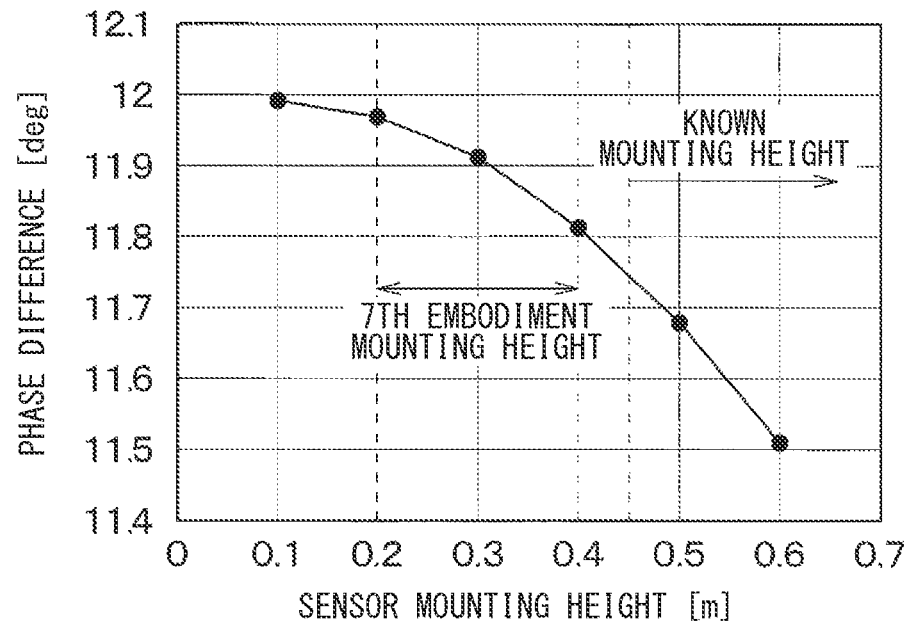
FIG. 22A is a diagram showing a relationship between (i) a sensor mounting height of an ultrasonic sensor and (ii) a phase difference when receiving a reflected wave reflected by an obstacle according to a seventh embodiment.
Figure 22B:
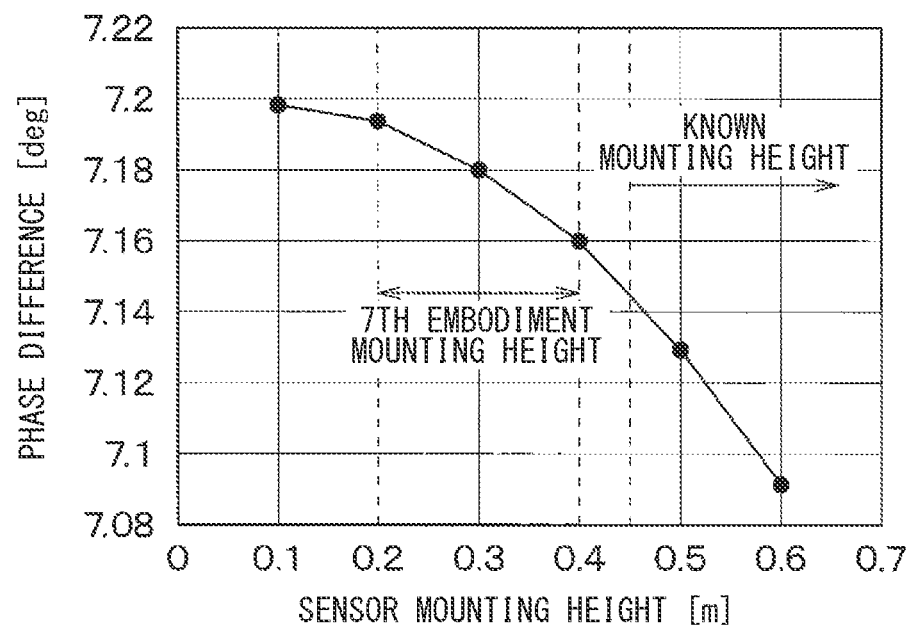
FIG. 22B is a diagram showing a relationship between (i) a sensor mounting height of an ultrasonic sensor and (ii) a phase difference when receiving a reflected wave reflected on a road surface according to the seventh embodiment.

First, as shown in FIGS. 22A and 22B, the lower the sensor mounting height H, the larger the phase difference tends to be, so that the sensitivity can be improved. However, in a known obstacle detection apparatus that detects the obstacle distance L only by the time of the reflected wave, the ultrasonic sensor 10 is attached at a height of 45 cm or more in consideration of the reflected wave from the road surface 300. In some cases, sufficient sensitivity could not be exhibited. Note that FIG. 22A is a simulation result when the reflected wave from the obstacle 200 having the obstacle distance L of 3 m is received. FIG. 22B is a simulation result when the reflected wave from the road surface 300 at a position 5 m from the ultrasonic sensor 10 is received.

On the other hand, in the present embodiment, as described in the first embodiment, the obstacle distance L is derived by using the phase difference of the reception wave. Then, the phase difference becomes extremely large when the reflected wave reflected by the obstacle 200 is received as shown in FIG. 22A than when the reflected wave reflected by the road surface 300 is received as shown in FIG. 22B.

Therefore, in the present embodiment, the sensor mounting height H can be arranged at a sufficiently low position. Specifically, the sensor mounting height H can be a height of 20 cm that can be, of a typical vehicle, the lowest portion closest to the road surface 300. Further, the sensor mounting height H can be set to a position of 40 cm or less so that a sufficient sensitivity can be exhibited as compared with the ultrasonic sensor 10 in a known obstacle detection apparatus. That is, in the present embodiment, the sensor mounting height H is 20 cm or more and 40 cm or less.

Then, when the ultrasonic sensor 10 is attached to such a position, for example, the following may be performed. That is, when the controller unit 100 compares the phase difference with a predetermined threshold value and determines that the phase difference is larger than the threshold value (that is, it is not a reflected wave from the road surface 300), the controller unit 100 may determine that the obstacle is a low height obstacle.

As described above, in the present embodiment, the ultrasonic sensor 10 has a sensor mounting height H of 20 cm or more and 40 cm or less (i.e., not less than 20 cm and not more than 40 cm). Therefore, the sensitivity can be further improved.

Eighth Embodiment

An eighth embodiment will be described. This embodiment is different from the first embodiment in that a temperature sensitive resistor is added to the ultrasonic sensor 10. Others are the same as those in the first embodiment, and thus the description thereof will be omitted here.

Figure 23:
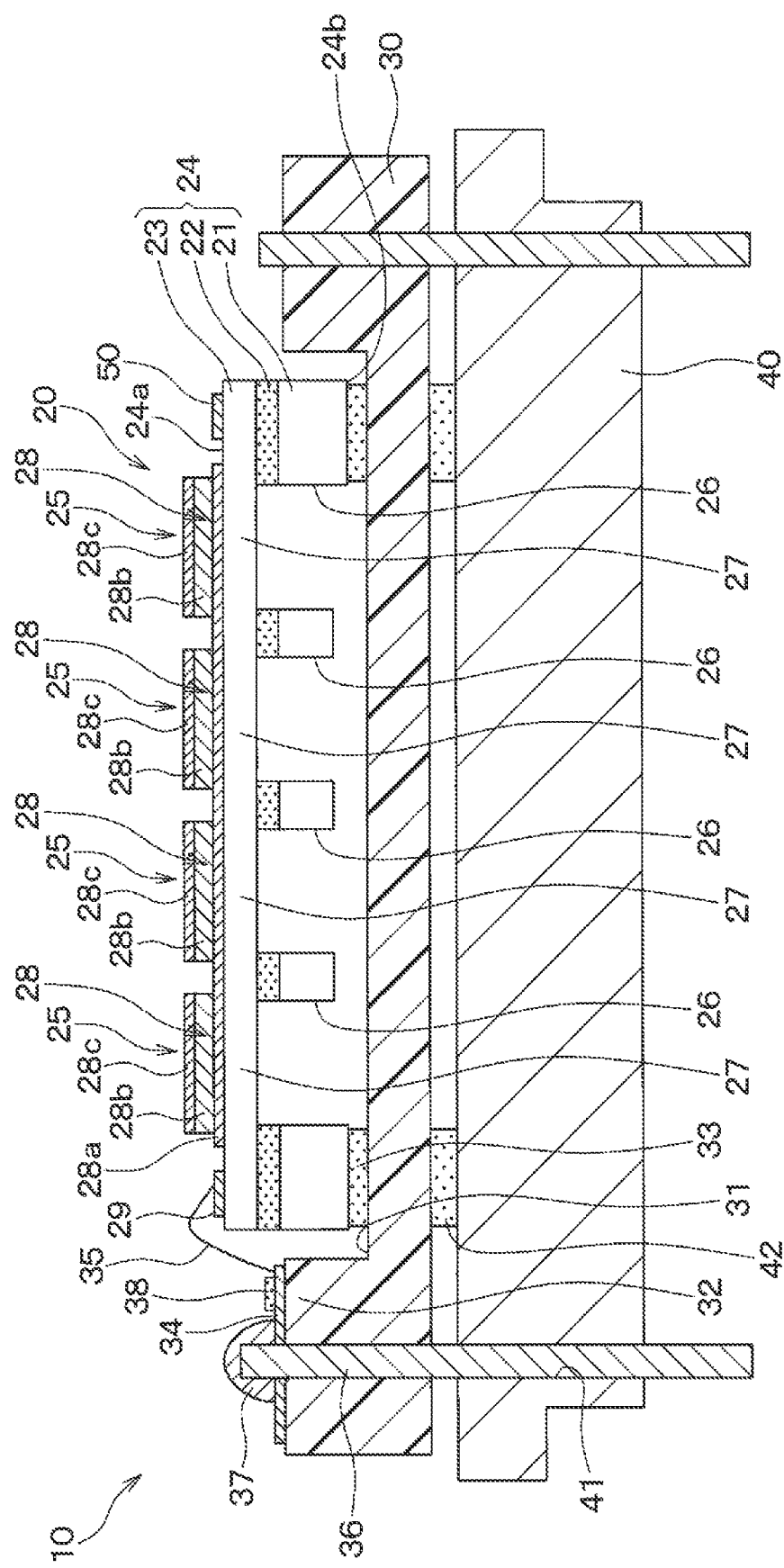
FIG. 23 is a cross-sectional view showing a structure of an ultrasonic sensor according to an eighth embodiment.

In the ultrasonic sensor 10 of the present embodiment, as shown in FIG. 23, a temperature sensitive resistor 50 whose resistance value changes according to the ambient temperature is formed on the first surface 24$a$ of the sensor substrate 24. Then, the controller unit 100 is also connected to the temperature sensitive resistor 50, and derives the obstacle distance L and the obstacle height h in consideration of the resistance value change (that is, the detection result) of the temperature sensitive resistor 50. That is, the controller unit 100 derives the obstacle distance L and the obstacle height h in consideration of the ambient temperature.

Specifically, if the sound velocity is v, the frequency of the exploration wave is f, and the wavelength of the exploration wave is λ, then v=fλ. The sound velocity v is represented by v=331.5+0.6T, where T is the temperature. Therefore, when the controller unit 100 derives the obstacle distance L to a high height obstacle as the obstacle 200 in step S107, the controller unit 100 derives the obstacle distance L in consideration of the temperature. Further, in step S110, the controller unit 100 derives the obstacle distance L and the obstacle height h to the low height obstacle as the obstacle 200. In this case, the obstacle distance L and the obstacle height h are derived by calculating the above Expressions 3 to 6 in consideration of the temperature.

According to this, since the obstacle distance L and the obstacle height h are derived in consideration of the temperature, the detection accuracy of the obstacle 200 can be further improved.

Ninth Embodiment

A ninth embodiment will be described. This embodiment is a modification of the configuration of the ultrasonic sensor 10 with respect to the first embodiment. Others are the same as those in the first embodiment, and thus the description thereof will be omitted here.

Figure 24:
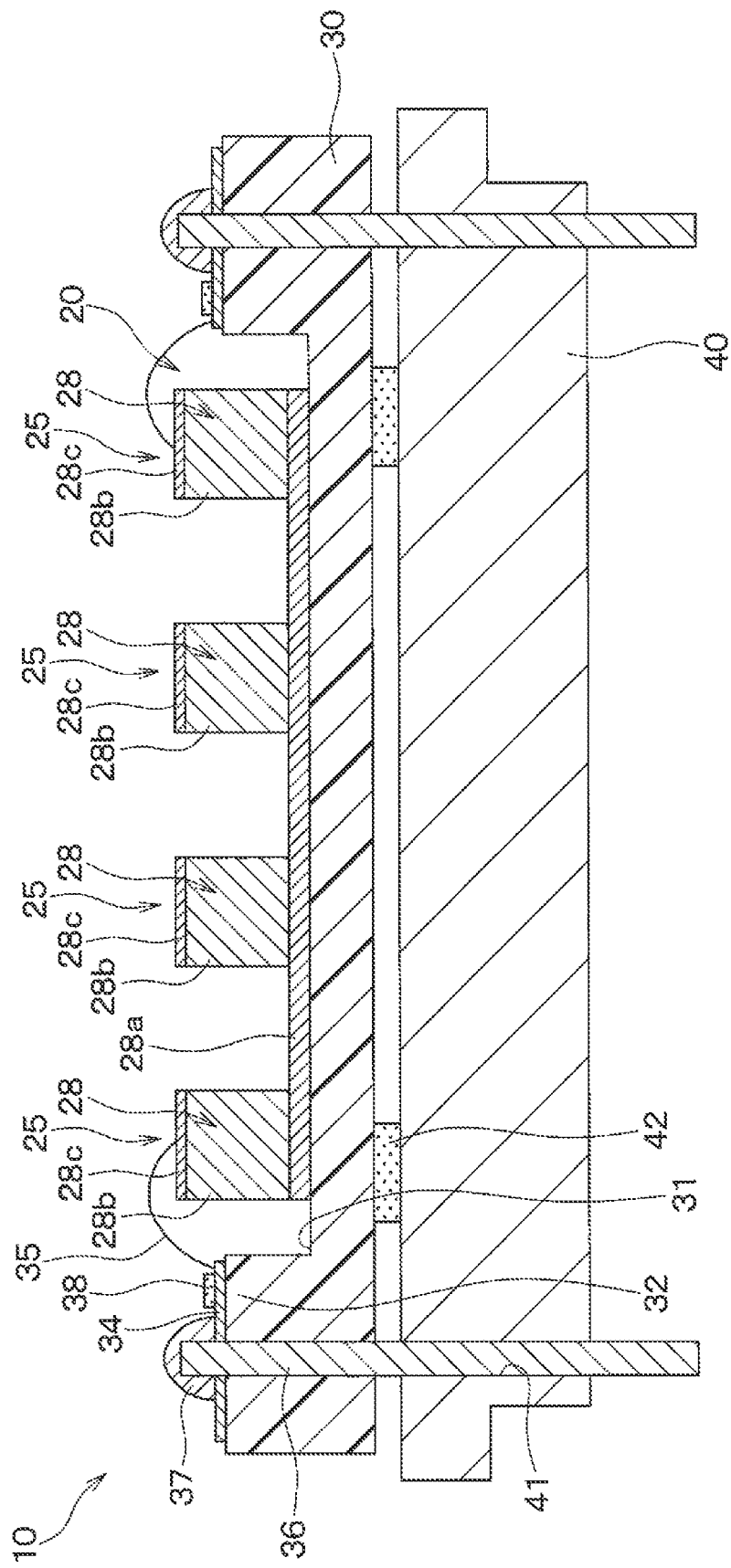
FIG. 24 is a cross-sectional view showing a structure of an ultrasonic sensor according to a ninth embodiment.

In the present embodiment, as shown in FIG. 24, the ultrasonic element 25 is configured by two-dimensionally arranging a plurality of piezoelectric elements 28 on the concave portion 31 formed in the support member 30. Specifically, in the present embodiment, the back surface electrode 28a is directly formed on the concave portion 31 of the support member 30, and the sensor substrate 24 is not provided. The piezoelectric element 28 has a bulk shape in which the piezoelectric film 28b is sufficiently thicker than that of the first embodiment. In the present embodiment, the ultrasonic element 25 is configured by such a piezoelectric element 28, and the transducer unit 20 is configured by providing a plurality of the ultrasonic elements 25.

Then, in each ultrasonic element 25, the back surface electrode 28a and the front surface electrode 28c are electrically connected to the pad portion 34 formed on the support member 30 via the bonding wire 35.

In such an ultrasonic sensor 10, when a drive voltage, which is an AC voltage, is applied to each piezoelectric element 28, the piezoelectric element 28 vibrates ultrasonically and transmits an exploration wave. Further, when the ultrasonic element 25 receives the reception wave, the piezoelectric element 28 vibrates and an electric charge is generated in the piezoelectric element 28. Therefore, when the ultrasonic element 25 receives the reception wave, it outputs a detection signal corresponding to the reception wave.

As described above, even if the ultrasonic element 25 is composed of the bulk piezoelectric element 28, the same effect as that of the first embodiment can be obtained.

Other Embodiments

Although the present disclosure has been described in accordance with embodiments, it is understood that the present disclosure is not limited to such embodiments or structures. The present disclosure encompasses various modifications and variations within the scope of equivalents. In addition, various combinations and configurations, as well as other combinations and configurations that include only one element, more, or less, are within the scope and spirit of the present disclosure.

For example, in each of the above embodiments, in the ultrasonic element 25, the distance d between the adjacent ultrasonic elements 25 may be set to half or more of the wavelength of the exploration wave.

Further, in the first to sixth and eighth embodiments, the ultrasonic sensor 10 may have a sensor mounting height H of 40 cm or more.

Then, each of the above embodiments can be combined as appropriate. For example, the second embodiment may be applied to the third to ninth embodiments, and the obstacle distance L and the obstacle height h may be derived using a map. The third embodiment may be applied to the fourth to ninth embodiments, and the obstacle distance L may be derived using the distance a, the distance b, and the distance c. The fourth embodiment may be applied to the fifth to ninth embodiments, and the obstacle distance L may be derived using the phase difference of the reception wave and the propagation time, respectively. It may be determined that the obstacle 200 is present between the two derived obstacle distances L. The fifth embodiment may be applied to the sixth to ninth embodiments, and the corrected obstacle distance La may be derived in consideration of the inclination of the road surface 300. The sixth embodiment may be applied to the seventh to ninth embodiments so that the directivity axis D of the exploration wave transmitted from the ultrasonic sensor 10 is inclined toward the road surface 300. The seventh embodiment may be combined with the eighth and ninth embodiments, and the sensor mounting height H may be 20 cm or more and 45 cm or less (i.e., not less than 20 cm and not more than 40 cm). The eighth embodiment may be combined with the ninth embodiment so that the ultrasonic sensor 10 is provided with a temperature sensitive resistor 50. Then, the combination of the above embodiments may be further combined, and the combination method can be appropriately changed.

Further, in each of the above embodiments, the case where the obstacle 200 has a convex structure protruding from the road surface 300 has been described. However, each of the above embodiments can be applied even when the obstacle 200 has a concave structure such as a groove.

Figure 25:
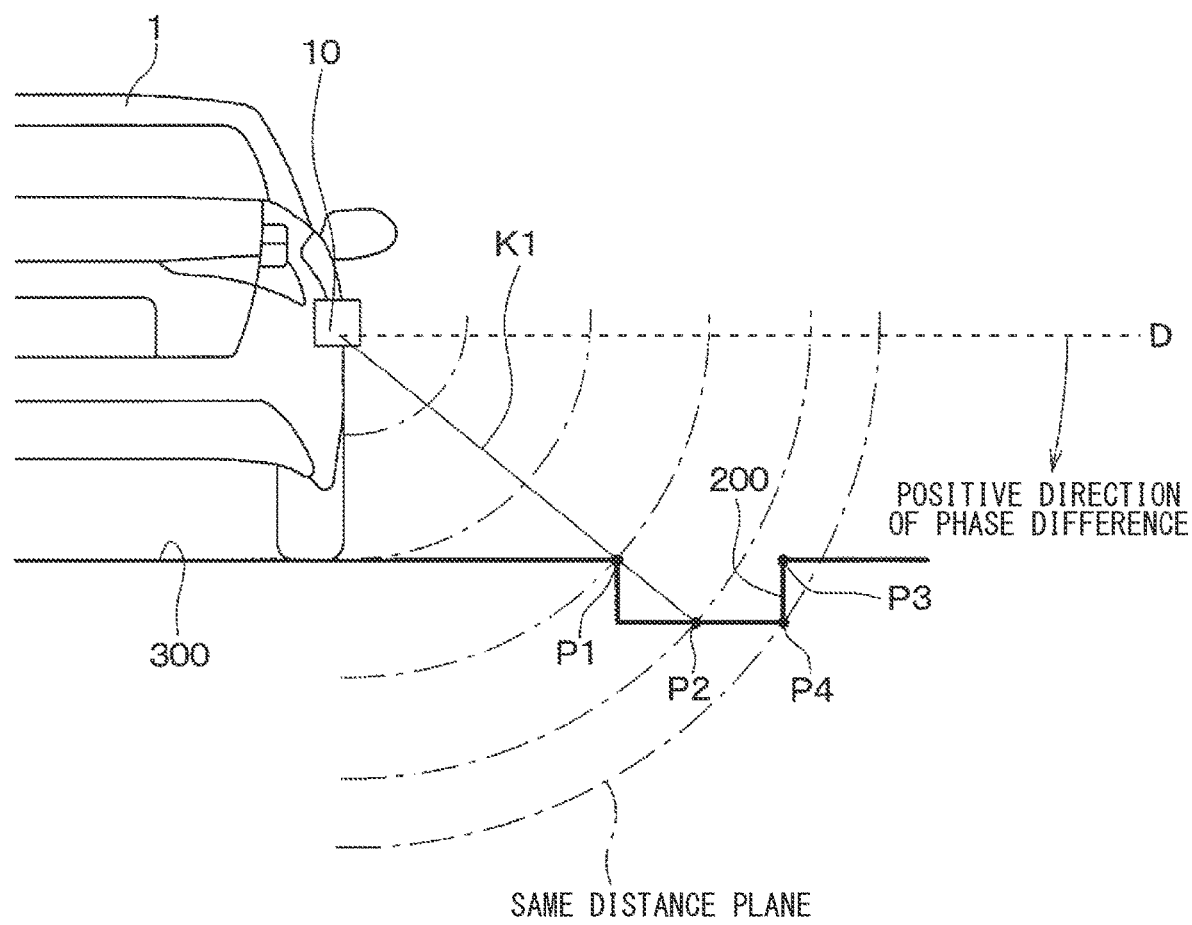
FIG. 25 is a schematic diagram showing a propagation path of a reflected wave when an obstacle is a groove according to another embodiment.

For example, as shown in FIG. 25, it is assumed that a groove having a concave structure is formed on the road surface 300 as an obstacle 200. Here, a case where the depth of the groove is shallower than the width will be described as an example. However, the depth of the groove portion is the length in the vertical direction of the paper surface in FIG. 25, and the width of the groove portion is the length in the horizontal direction of the paper surface in FIG. 25.

Then, the upper end corner of the groove on the vehicle side is designated as a point P1, the virtual line connecting the ultrasonic sensor 10 and the point P1 is designated as a virtual line K1, and the intersection of the virtual line K1 and the groove is designated as a point P2. Further, the upper end corner of the groove on the opposite side of the vehicle 1 is designated as a point P3, and the lower end corner of the groove on the opposite side of the vehicle 1 is designated as a point P4. Then, when the ultrasonic sensor 10 transmits the exploration wave, the reflected wave from the road surface 300 is also received.

Figure 26:
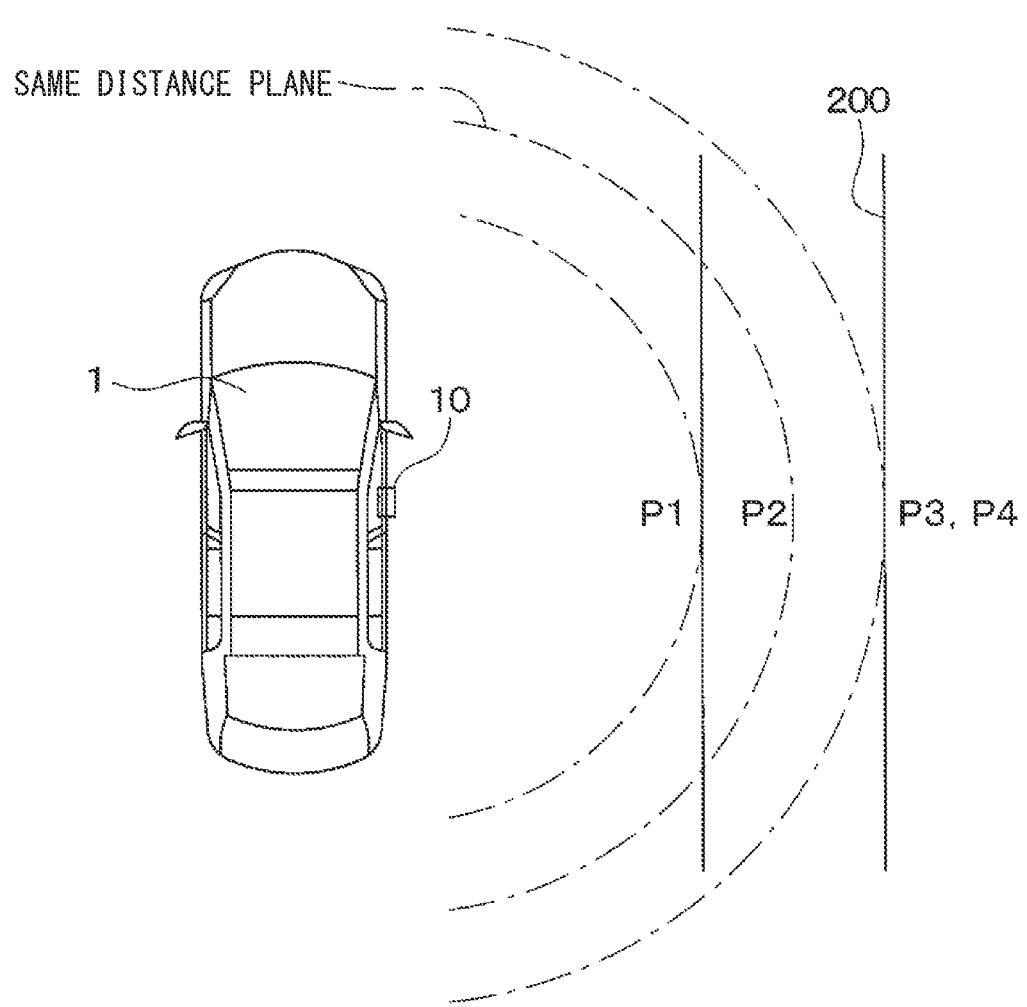
FIG. 26 is a plan view corresponding to FIG. 25.
Figure 27:
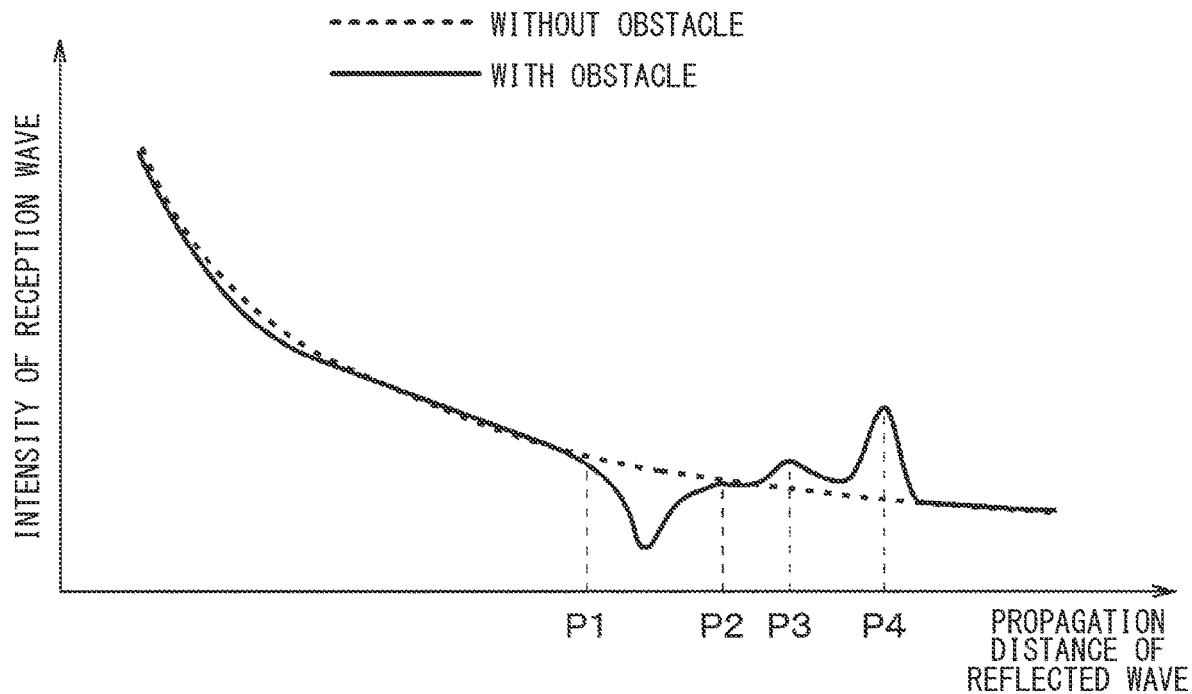
FIG. 27 is a diagram showing a relationship between a propagation distance of a reflected wave and an intensity of a reception wave when the obstacle shown in FIG. 25 is present.

In this case, the ultrasonic sensor 10 receives the reflected wave in the order of the shortest propagation path of the exploration wave and the reflected wave. Specifically, as shown in FIGS. 26 and 27, the ultrasonic sensor 10 receives the reflected waves reflected at the point P1, the point P2, the point P3, and the point P4 in order at the portion where the groove is formed. In addition, in FIG. 27, the solid line shows the relationship between the propagation distance and the intensity of the reception wave when the groove as the obstacle 200 is formed. The broken line shows the relationship between the propagation distance and the intensity of the reception wave when the obstacle 200 is not formed. However, the relationship between the propagation distance and the intensity of the reception wave when the obstacle 200 is not formed here is the relationship when it is assumed that the reflected wave reflected on the virtual horizontal plane passing through the points P1 and P3 is received.

The intensity of the reception wave decreases as the distance increases in the absence of the obstacle 200. In this case, in the portion where the groove is formed, the reflected wave is obstructed by the side wall of the groove or the like, so that the wave is once steeply lowered with the point P1 as the boundary. As shown in FIG. 26, the ultrasonic sensor 10 also receives reflected waves from portions where the groove is not formed and the distances are the same. Therefore, the intensity of the reception wave does not become zero.

After that, the intensity of the reception wave becomes the same value as when the obstacle 200 does not exist at the point P2, becomes larger at the upper end corner of the point P3, and then becomes much larger at the lower end corner of the point P4 due to the influence of the multiple reflected waves.

Figure 28:
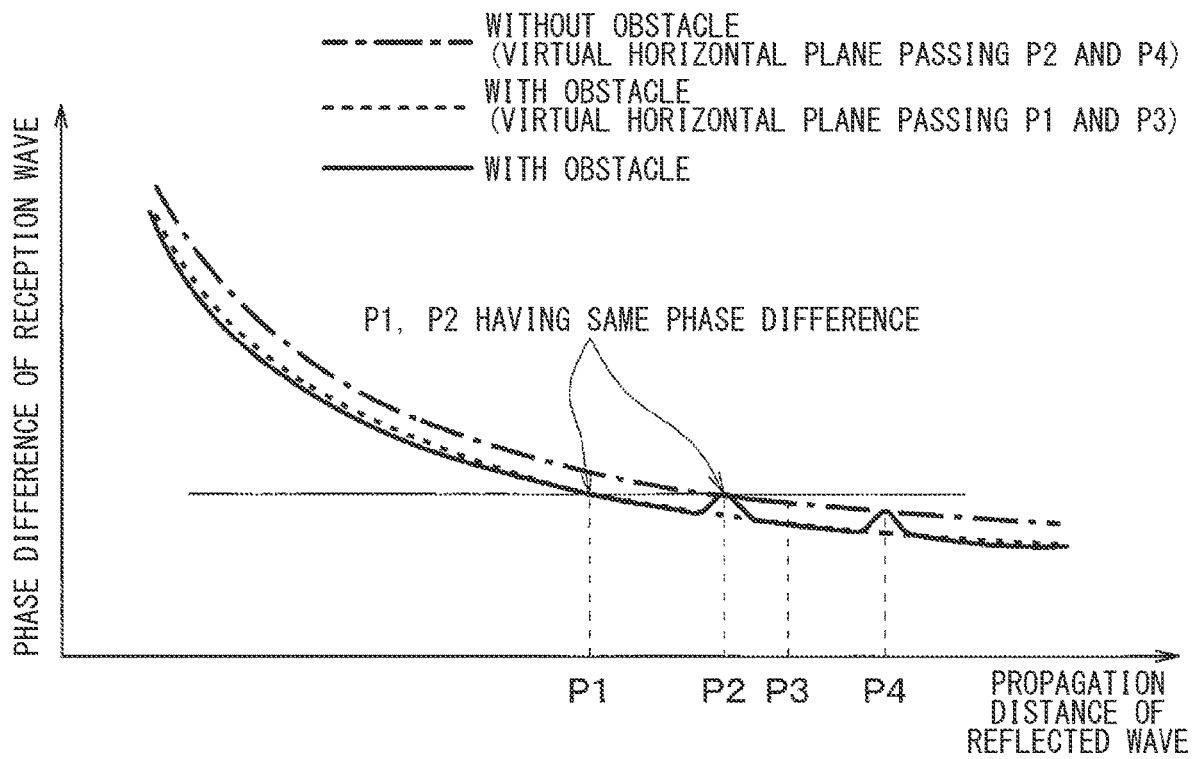
FIG. 28 is a diagram showing a relationship between a propagation distance of a reflected wave and a phase difference of a reception wave when the obstacle shown in FIG. 25 is present.

Further, as shown in FIG. 28, the phase difference of the reception wave becomes smaller as the distance increases in the absence of the obstacle 200. In FIG. 28, the solid line shows the relationship between the propagation distance and the phase difference of the reception wave when the groove as the obstacle 200 is formed. The broken line shows the relationship between the propagation distance and the phase of the reception wave when it is assumed that the reflected wave reflected by the virtual horizontal plane passing through the points P1 and P3 is received. The alternate long and short dash line shows the relationship between the propagation distance and the phase difference of the reception wave when it is assumed that the reflected wave reflected by the virtual horizontal plane passing through the point P2 and the point P4 is received.

In this case, in the portion where the groove is formed, the phase difference when the reflected wave from the point P1 and the point P2 is received is the same because the point P1 and the point P2 are located on the common virtual line K1. Further, the phase difference when the reflected wave from the point P1 and the point P3 is received is matches the phase difference when it is assumed that the reflected wave reflected by the virtual horizontal plane passing through the points P1 and P3 is received (that is, it matches the broken line in FIG. 28). Similarly, the phase difference when the reflected wave from the point P2 and the point P4 is received matches the phase difference when it is assumed that the reflected wave reflected by the virtual horizontal plane passing through the points P2 and P4 is received (that is, it matches the alternate long and short dash line in FIG. 28). That is, when the groove is formed, the phase difference of the reception wave becomes a waveform that sharply increases at the points P2 and P4.

Figure 29:
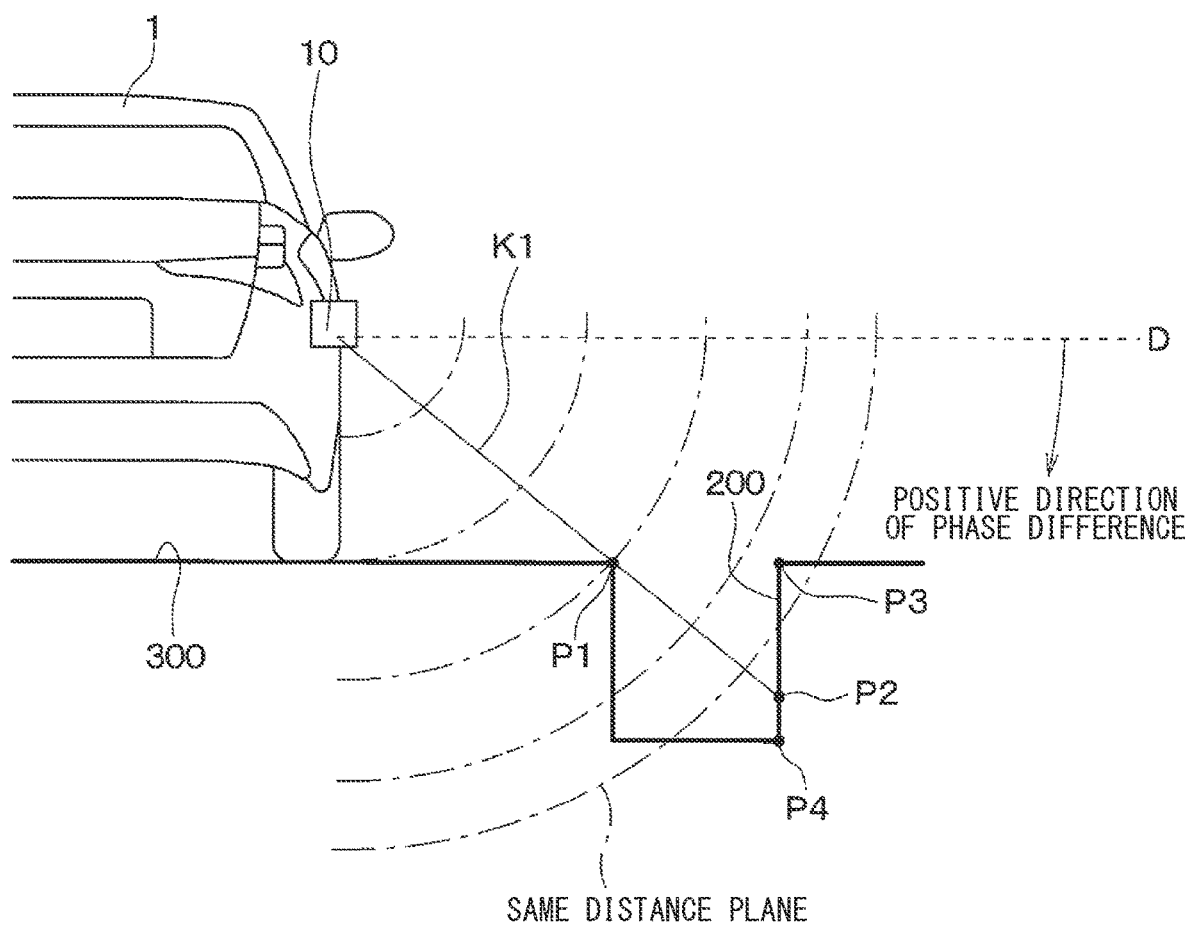
FIG. 29 is a schematic diagram showing a propagation path of a reflected wave when an obstacle is a groove according to another embodiment.

Further, for example, as shown in FIG. 29, a groove having a depth deeper than the width may be formed as an obstacle 200 on the road surface 300. In this case, as in FIG. 25, the upper end corner of the groove on the vehicle side is set as the point P1, the virtual line connecting the ultrasonic sensor 10 and the point P1 is set as the virtual line K1, and the intersection of the virtual line K1 and the groove is set as the point P2. Further, the upper end corner of the groove on the opposite side of the vehicle 1 is designated as the point P3, and the lower end corner of the groove on the opposite side of the vehicle 1 is designated as the point P4. In the example of FIG. 29, since the depth is deeper than the width, the point P2 is a point between the point P3 and the point P4. Then, when the ultrasonic sensor 10 transmits the exploration wave, the reflected wave from the road surface 300 is also received.

Figure 30:
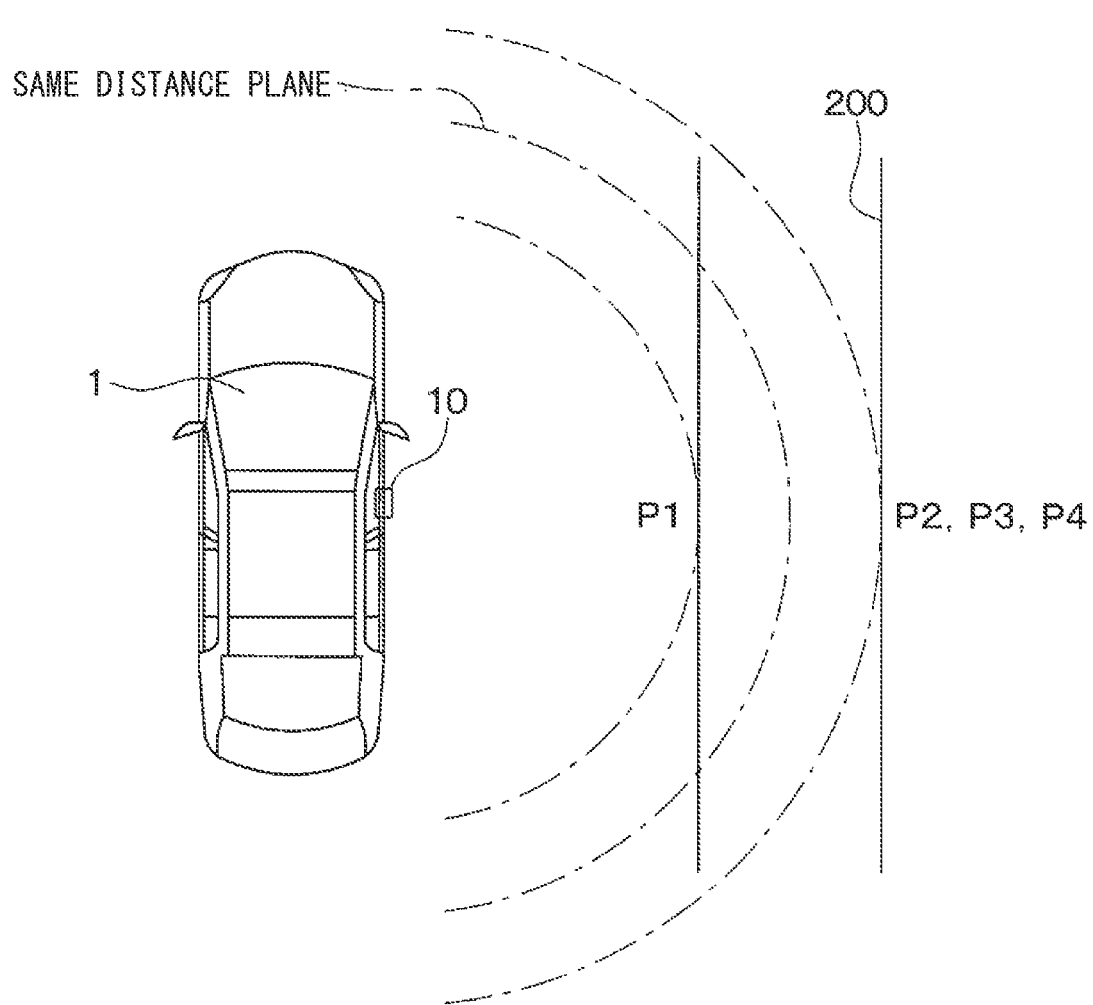
FIG. 30 is a plan view corresponding to FIG. 29.
Figure 31:
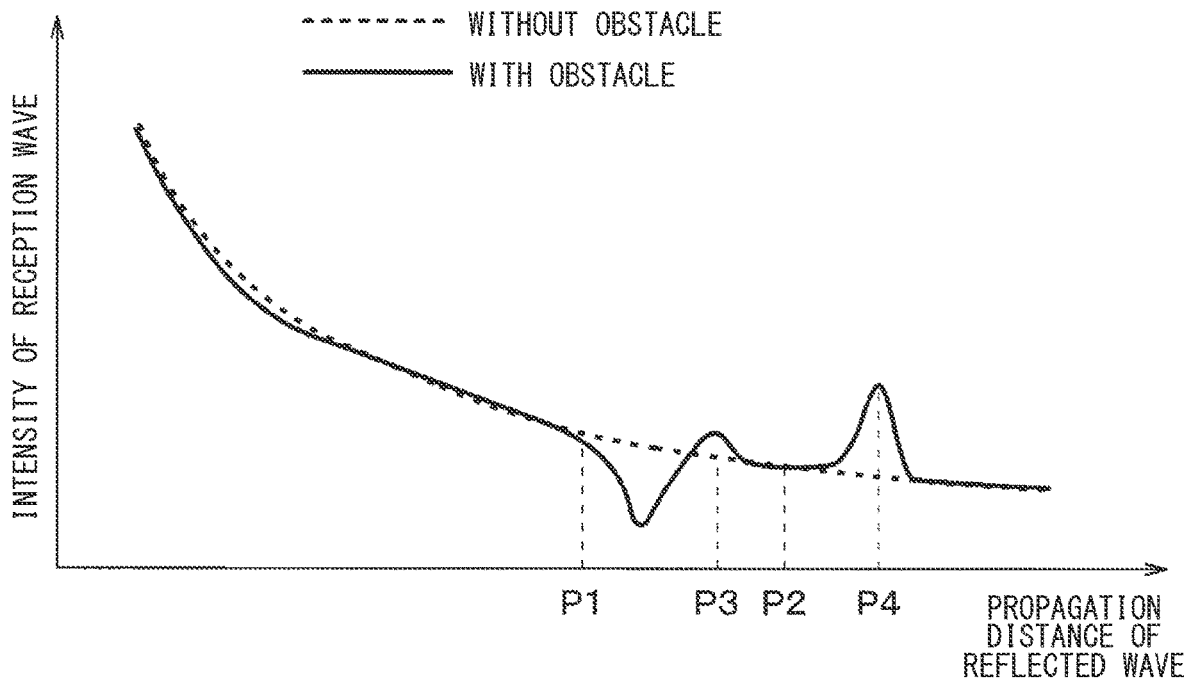
FIG. 31 is a diagram showing a relationship between a propagation distance of a reflected wave and an intensity of a reception wave when the obstacle shown in FIG. 29 is present.

In this case, the ultrasonic sensor 10 receives the reflected wave in the order of the shortest propagation path of the exploration wave and the reflected wave. Specifically, as shown in FIGS. 30 and 31, the ultrasonic sensor 10 receives the reflected waves reflected at the points P1, the point P3, the points P2, and the points P4 in order, at the portion where the groove is formed. In FIG. 31, the solid line shows the relationship between the propagation distance and the intensity of the reception wave when the groove as the obstacle 200 is formed. The broken line shows the relationship between the propagation distance and the intensity of the reception wave when the obstacle 200 is not formed. However, the relationship between the propagation distance and the intensity of the reception wave when the obstacle 200 is not formed here is the relationship when it is assumed that the reflected wave reflected on the virtual horizontal plane passing through the points P1 and P3 is received.

The intensity of the reception wave decreases as the distance increases in the absence of the obstacle 200. In this case, in the portion where the groove is formed, the reflected wave is obstructed by the side wall of the groove or the like, so that the wave is once steeply lowered with the point P1 as the boundary. As shown in FIG. 30, the ultrasonic sensor 10 also receives reflected waves from portions where the groove is not formed and the distances are the same. Therefore, the intensity of the reception wave does not become zero.

After that, the intensity of the reception wave becomes the same value as when the obstacle 200 does not exist at the point P2 after increasing at the upper end corner of the point T3, and then the intensity of the reception wave becomes even larger due to the influence of the multiple reflected waves at the lower end corner of the point P4.

Figure 32:
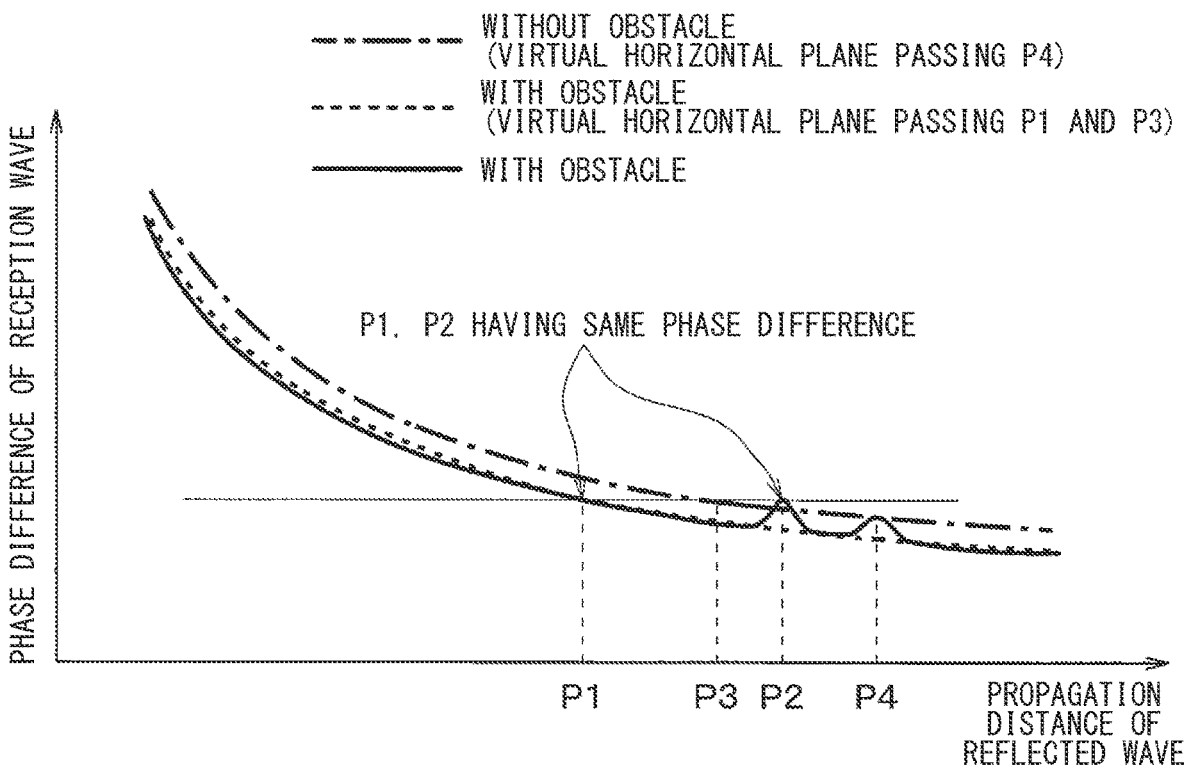
FIG. 32 is a diagram showing a relationship between a propagation distance of a reflected wave and a phase difference of a reception wave when the obstacle shown in FIG. 29 is present.

Further, as shown in FIG. 32, the phase difference of the reception wave becomes smaller as the distance increases in the absence of the obstacle 200. In FIG. 32, the solid line shows the relationship between the propagation distance and the phase of the reception wave when the groove as the obstacle 200 is formed. The broken line shows the relationship between the propagation distance and the phase of the reception wave when it is assumed that the reflected wave reflected by the virtual horizontal plane passing through the points P1 and P3 is received. The alternate long and short dash line shows the relationship between the propagation distance and the phase of the reception wave when it is assumed that the reflected wave reflected in the virtual horizontal plane parallel to the virtual horizontal plane passing through the points P1 and P3 is received.

In this case, in the portion where the groove is formed, the phase difference when the reflected wave from the point P1 and the point P2 is received is the same because the point P1 and the point P2 are located on the common virtual line K1. Further, the phase difference when the reflected wave from the point P1 and the point P3 is received matches the phase difference when the reflected wave reflected on the virtual horizontal plane passing through the point P1 and the point P3 is assumed to be received (that is, matching the broken line in FIG. 32). Similarly, the phase difference when the reflected wave from the point P4 is received matches the phase difference when the reflected wave reflected by the virtual horizontal plane passing through the point P4 is assumed to be received (that is, matching the alternate long and short dash line in FIG. 32). That is, when the groove is formed, the phase difference of the reception wave becomes a waveform that sharply increases at the points P2 and P4.

As described above, even when the obstacle 200 has a concave structure, the phase difference changes sharply. Then, the way of changing the phase difference changes sharply at the points P2 and P4 regardless of the relationship between the depth and the width of the concave structure. Therefore, even if the obstacle 200 has a concave structure such as a groove, each of the above embodiments can be applied.

Further, when the obstacle 200 has a concave structure, the phase difference of the reception wave received by the ultrasonic sensor 10 has a waveform including a portion where the phase difference sharply increases because the reflected wave in the concave structure is received, as shown in FIGS. 28 and 32. On the other hand, when the obstacle 200 has a convex structure protruding from the road surface 300, the phase difference of the reception wave received by the ultrasonic sensor 10 has a waveform including a portion where the phase difference sharply decreases because the reflected wave in the convex structure is received.

That is, the way in which the phase difference fluctuates is opposite between the case where the obstacle 200 has a convex structure and the case where the obstacle 200 has a concave structure. Therefore, the controller unit 100 can easily determine whether the obstacle 200 has a convex structure or a concave structure by considering how the phase difference fluctuates.

The controller (i.e., controller unit) and method thereof described in the present disclosure may be implemented by one or more than one special purpose computer, which may be created by configuring (a) a memory and a processor programmed to execute one or more particular functions embodied in computer programs. Alternatively, the controller (i.e., controller unit) and method thereof described in the present disclosure may be implemented by one or more than one special purpose computer, which may be created by configuring (b) a processor provided by one or more special purpose hardware logic circuits. Yet alternatively, the controller (i.e., controller unit) and method thereof described in the present disclosure may be implemented by one or more than one special purpose computer, which may be created by configuring a combination of (a) a memory and a processor programmed to execute one or more particular functions embodied in computer programs and (b) a processor provided by one or more special purpose hardware logic circuits. The computer program may also be stored in a computer-readable non-transitory tangible storage medium as instructions to be executed by a computer.

For reference to further explain features of the present disclosure, the description is added as follows.

There has been proposed an obstacle detection apparatus using an ultrasonic sensor. Specifically, in this obstacle detection apparatus, an ultrasonic sensor is provided at a position with a predetermined height of the vehicle. Then, when the ultrasonic sensor transmits an exploration wave and then receives a reception wave, the obstacle detection apparatus determines the height of the obstacle based on the number of maximum peaks included in the reception wave. Specifically, when there are multiple maximum peaks contained in the reception wave, the obstacle detection apparatus determines that there is a high height obstacle having a height higher than the position where the ultrasonic sensor is provided. In contrast, when there is one maximum peak contained in the reception wave, the obstacle detection apparatus determines that there is a low height obstacle having a height lower than that of the position where the ultrasonic sensor is provided. For instance, the high height obstacle is a wall; the low height obstacle is a curb or a tire stopper block.

In addition, when an obstacle detection apparatus receives a reception wave after the ultrasonic sensor transmits the exploration wave, the obstacle detection apparatus derives the obstacle distance to the obstacle based on the period of time from the transmission of the exploration wave to the reception of the reception wave. The present inventors examined the above obstacle detection apparatus and confirmed the following. When multiple low height obstacles having mutually different distances from an ultrasonic sensor are placed close to each other and reflect the exploration wave, the reception wave contains multiple maximum peaks. Therefore, the obstacle detection apparatus as described above may erroneously detect the existence of a high height obstacle when a plurality of low height obstacles are placed close to each other.

It is thus desired for the present disclosure to provide an obstacle detection apparatus capable of improving detection accuracy.

An aspect of the present disclosure described herein is set forth in the following clauses.

According to an aspect of the present disclosure, an obstacle detection apparatus that detects an obstacle existing around a vehicle is provided to include an ultrasonic sensor and a controller. The ultrasonic sensor is provided in the vehicle at a position having a predetermined height from a road surface. The ultrasonic sensor includes a plurality of ultrasonic elements configured to transmit an exploration wave toward outside of the vehicle, and receive a reflected wave reflected by an obstacle as a reception wave. The controller is configured to derive (i) an obstacle distance, which is a distance to the obstacle, and (ii) an obstacle height, which is a height of the obstacle, based on the reception wave, to perform a predetermined process. Herein, the controller is further configured to derive the obstacle distance and the obstacle height based on an intensity of the reception wave received by each of the plurality of ultrasonic elements and a phase difference in the reception wave received by each of the plurality of ultrasonic elements.

Here, suppose a case where a plurality of ultrasonic elements receive the reception wave. When the reflected wave reflected by the high height obstacle is received, the reflected wave having no phase difference is also received. In contrast, when the reflected wave reflected by the low height obstacle is received, only the reflected wave having the phase difference is received. Therefore, the controller unit derives the obstacle height based on the phase difference. As a result, even when a plurality of low height obstacles having different distances from the ultrasonic sensor exist in close proximity to each other, it is possible to prevent the obstacles from being erroneously detected as a high height obstacle. Therefore, the detection accuracy can be improved.

What is claimed is:

1. An obstacle detection apparatus that detects an obstacle existing around a vehicle, the obstacle detection apparatus comprising:
    an ultrasonic sensor provided in the vehicle at a position having a predetermined height from a road surface, the ultrasonic sensor including a plurality of ultrasonic elements configured to transmit an exploration wave toward outside of the vehicle and receive a reflected wave reflected by an obstacle as a reception wave; and
    a controller configured to derive (i) an obstacle distance that is a distance to the obstacle and (ii) an obstacle height that is a height of the obstacle, based on the reception wave, to perform a predetermined process,
    wherein:
    the controller is further configured to derive the obstacle distance and the obstacle height based on (i) an intensity of the reception wave received by each of the plurality of ultrasonic elements and (ii) a phase difference in the reception wave received by each of the plurality of ultrasonic elements,
    in response to determining that no phase difference exists in the reception wave received by each of the plurality of ultrasonic elements, the controller is further configure to determine that the obstacle height is equal to or higher than the predetermined height, and
    in response to determining that the phase difference exists in the reception wave received by each of the plurality of ultrasonic elements, the controller is further configured to determine that the obstacle height is lower than the predetermined height.

2. The obstacle detection apparatus according to claim 1, wherein:
    in response to determining that the obstacle height is lower than the predetermined height, the controller is further configured to define, as a first phase difference, the phase difference in a reflected wave reflected at a boundary portion between the obstacle and the road surface, and define, as a second phase difference, the phase difference in a reflected wave reflected at an upper end of the obstacle; and the controller is further configured to derive the obstacle distance and the obstacle height using the first phase difference and the second phase difference.

3. The obstacle detection apparatus according to claim 2, wherein:

the controller is further configured to derive a first obstacle distance based on the first phase difference and the second phase difference, derive a second obstacle distance based on a period of time from when the ultrasonic sensor transmits the exploration wave to when the ultrasonic sensor receives the reception wave, and determine that the obstacle exists between the first obstacle distance and the second obstacle distance, to perform the predetermined process.

4. The obstacle detection apparatus according to claim 1, wherein:

the controller is further configured to derive an inclination of the road surface and derive a corrected obstacle distance along the road surface as the obstacle distance in consideration of the derived inclination of the road surface.

5. The obstacle detection apparatus according to claim 1, wherein:

in response to the obstacle height being lower than the predetermined height, the controller is further configured to perform the predetermined process according to the obstacle height.

6. The obstacle detection apparatus according to claim 1, wherein:

the ultrasonic sensor is provided at the position having the predetermined height being not lower than 20 cm and not higher than 40 cm from the road surface.

7. The obstacle detection apparatus according to claim 1, wherein:

the plurality of ultrasonic elements are formed by arranging a plurality of piezoelectric elements each having a piezoelectric film; and the exploration wave is transmitted by controlling a drive voltage that is applied to the piezoelectric elements in the plurality of ultrasonic elements.

8. The obstacle detection apparatus according to claim 7, wherein:

in the plurality of ultrasonic elements, a distance between centers of adjacent ultrasonic elements is less than half of a wavelength of the exploration wave.

9. The obstacle detection apparatus according to claim 7, wherein:

a total number of ultrasonic elements or a total number of ultrasonic elements to which the drive voltage is applied is adjusted to enable the ultrasonic sensor to have a predetermined directivity angle.

10. The obstacle detection apparatus according to claim 7, wherein:

a phase of the drive voltage applied to the plurality of ultrasonic elements is adjusted to enable the ultrasonic sensor to have a directivity axis along a predetermined direction.

11. The obstacle detection apparatus according to claim 7, wherein:

the ultrasonic sensor includes a temperature sensitive resistor of which a resistance value changes according to a temperature; and the controller is further configured to derive the obstacle distance and the obstacle height in consideration of a detection result of the temperature sensitive resistor.

12. The obstacle detection apparatus according to claim 7, wherein:

the piezoelectric film is made of scandium aluminum nitride or aluminum nitride.

* * * * *